US012219609B2

(12) United States Patent
Cozzo et al.

(10) Patent No.: US 12,219,609 B2
(45) Date of Patent: Feb. 4, 2025

(54) RESOURCE SELECTION FOR UPLINK CHANNELS DURING INITIAL ACCESS

(71) Applicant: Samsung Electronics Co., Ltd., Suwon-si (KR)

(72) Inventors: Carmela Cozzo, San Diego, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 358 days.

(21) Appl. No.: 17/653,099

(22) Filed: Mar. 1, 2022

(65) Prior Publication Data
US 2022/0287103 A1    Sep. 8, 2022

Related U.S. Application Data

(60) Provisional application No. 63/279,433, filed on Nov. 15, 2021, provisional application No. 63/155,974, filed on Mar. 3, 2021, provisional application No. 63/155,901, filed on Mar. 3, 2021.

(51) Int. Cl.
*H04W 4/00*    (2018.01)
*H04W 74/0833*    (2024.01)

(52) U.S. Cl.
CPC ................ *H04W 74/0833* (2013.01)

(58) Field of Classification Search
CPC ................................. H04W 74/0833
See application file for complete search history.

(56) References Cited

U.S. PATENT DOCUMENTS

| 11,653,346 B2 * | 5/2023 | Lin ................ H04W 74/0833 370/329 |
| 2012/0236810 A1 | 9/2012 | Park et al. |
| 2019/0037569 A1 | 1/2019 | Lee et al. |

(Continued)

FOREIGN PATENT DOCUMENTS

| CN | 111567126 A | 8/2020 |
| EP | 3386261 A1 | 10/2018 |
| EP | 4135457 A1 | 2/2023 |

OTHER PUBLICATIONS

International Search Report and Written Opinion issued Jun. 15, 2022 regarding International Application No. PCT/KR2022/002977, 9 pages.

(Continued)

*Primary Examiner* — Elisabeth Benoit Magloire

(57) ABSTRACT

Apparatuses and methods for resource selection for physical channels during initial access. A method of operating a user equipment (UE) includes receiving first information indicating a first partition of physical random access channel (PRACH) resources into a first group and a second group. A first PRACH transmission using a first PRACH resource from the first group of PRACH resources indicates a first set of features for the UE. A second PRACH transmission using a second PRACH resource from the second group of PRACH resources indicates a second set of features for the UE. The UE further includes determining a PRACH resource from the first group of PRACH resources or from the second group of PRACH resources and transmitting a PRACH using the determined PRACH resource in a RACH occasion (RO).

15 Claims, 23 Drawing Sheets

(56) References Cited

U.S. PATENT DOCUMENTS

| | | | |
|---|---|---|---|
| 2019/0342813 A1 | 11/2019 | Fasil Abdul et al. | |
| 2020/0187245 A1* | 6/2020 | Fujishiro | H04W 74/0833 |
| 2020/0260495 A1* | 8/2020 | Kim | H04W 74/006 |
| 2020/0314910 A1* | 10/2020 | Höglund | H04W 48/10 |
| 2020/0359425 A1 | 11/2020 | Chen et al. | |
| 2020/0382264 A1* | 12/2020 | Aiba | H04L 5/0094 |
| 2020/0404715 A1 | 12/2020 | Zhou et al. | |
| 2021/0105813 A1* | 4/2021 | Lee | H04W 76/27 |
| 2021/0298108 A1* | 9/2021 | Wu | H04W 74/0833 |
| 2021/0315005 A1* | 10/2021 | Choe | H04W 74/04 |
| 2021/0410186 A1* | 12/2021 | Hajir | H04W 72/0453 |

OTHER PUBLICATIONS

"3rd Generation Partnership Project; Technical Specification Group Radio Access Network; NR; Physical channels and modulation (Release 16)", 3GPP TS 38.211 V16.0.0, Dec. 2019, 129 pages.

"3rd Generation Partnership Project; Technical Specification Group Radio Access Network; NR; Multiplexing and channel coding (Release 16)", 3GPP TS 38.212 V16.0.0, Dec. 2019, 145 pages.

"3rd Generation Partnership Project; Technical Specification Group Radio Access Network; NR; Physical layer procedures for control (Release 16)", 3GPP TS 38.213 V16.0.0, Dec. 2019, 146 pages.

"3rd Generation Partnership Project; Technical Specification Group Radio Access Network; NR; Physical layer procedures for data (Release 16)", 3GPP TS 38.214 V16.0.0, Dec. 2019, 147 pages.

"5G; NR; Medium Access Control (MAC) protocol specification (3GPP TS 38.321 version 15.8.0 Release 15)", ETSI TS 138 321 V15.8.0, Jan. 2020, 80 pages.

"5G; NR; Radio Resource Control (RRC); Protocol specification (3GPP TS 38.331 version 15.8.0 Release 15)", ETSI TS 138 331 V15.8.0, Jan. 2020, 527 pages.

Extended European Search Report issued May 13, 2024 regarding Application No. 22763595.0, 9 pages.

Xiaomi, "Discussion on Type A PUSCH repetition for Msg3", 3GPP TSG RAN WG1 #104-e, R1-2101130, Jan. 2021, 5 pages.

* cited by examiner

RESOURCE SELECTION FOR UPLINK CHANNELS DURING INITIAL ACCESS

CROSS-REFERENCE TO RELATED APPLICATION AND CLAIM OF PRIORITY

This application claims priority under 35 U.S.C. § 119(e) to U.S. Provisional Patent Application No. 63/155,901 filed on Mar. 3, 2021; U.S. Provisional Patent Application No. 63/155,974 filed on Mar. 3, 2021; and U.S. Provisional Patent Application No. 63/279,433 filed on Nov. 15, 2021. The above-identified provisional patent applications are hereby incorporated by reference in their entirety.

TECHNICAL FIELD

The present disclosure relates generally to wireless communication systems and, more specifically, the present disclosure relates to resource selection for a physical random access channel (PRACH).

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to resource allocation for a PUSCH during initial access.

In one embodiment, a user equipment (UE) is provided. The UE includes comprising a transceiver configured to receive first information indicating a first partition of physical random access channel (PRACH) resources into a first group and a second group. A first PRACH transmission using a first PRACH resource from the first group of PRACH resources indicates a first set of features for the UE. A second PRACH transmission using a second PRACH resource from the second group of PRACH resources indicates a second set of features for the UE. The UE further includes a processor operably coupled to a transceiver. The processor is configured to determine a PRACH resource from the first group of PRACH resources or from the second group of PRACH resources. The transceiver is further configured to transmit a PRACH using the determined PRACH resource in a RACH occasion (RO).

In another embodiment, a base station (BS) is provided. The BS includes a transceiver configured to transmit first information indicating a first partition of PRACH resources into a first group and a second group. A first PRACH reception using a first PRACH resource from the first group of PRACH resources indicates a first set of features for a UE. A second PRACH reception using a second PRACH resource from the second group of PRACH resources indicates a second set of features for the UE. The BS further includes a processor operably coupled to a transceiver. The processor is configured to determine a PRACH resource from the first group of PRACH resources or from the second group of PRACH resources. The transceiver is further configured to receive a PRACH using the determined PRACH resource in a RO.

In yet another embodiment, a method of operating a UE is provided. The method includes receiving first information indicating a first partition of PRACH resources into a first group and a second group. A first PRACH transmission using a first PRACH resource from the first group of PRACH resources indicates a first set of features for the UE. A second PRACH transmission using a second PRACH resource from the second group of PRACH resources indicates a second set of features for the UE; The UE further includes determining a PRACH resource from the first group of PRACH resources or from the second group of PRACH resources and transmitting a PRACH using the determined PRACH resource in a RO.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
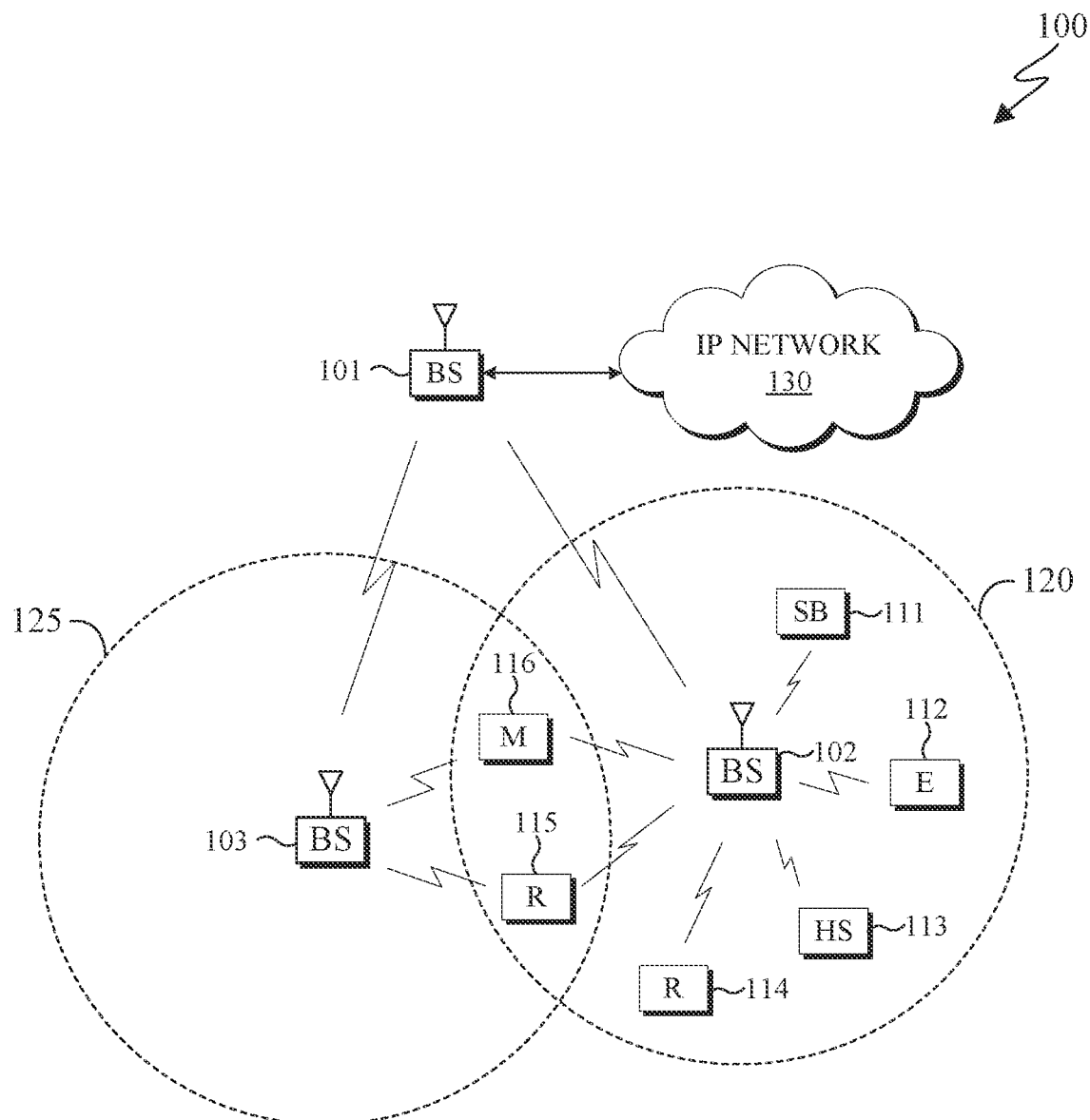
FIG. 1 illustrates an example wireless network according to embodiments of the present disclosure.

FIGS. 1 through 24, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v16.0.0, "NR; Physical channels and modulation" ("REF1"); 3GPP TS 38.212 v16.0.0, "NR; Multiplexing and channel coding" ("REF2"); 3GPP TS 38.213 v16.0.0, "NR; Physical layer procedures for control" ("REF3"); 3GPP TS 38.214 v16.0.0, "NR; Physical layer procedures for data" ("REF4"); 3GPP TS 38.321 v15.8.0, "NR; Medium Access Control (MAC) Protocol Specification" ("REF5"); and 3GPP TS 38.331 v15.8.0, "NR; Radio Resource Control (RRC) Protocol Specification" ("REF6").

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macro-cell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
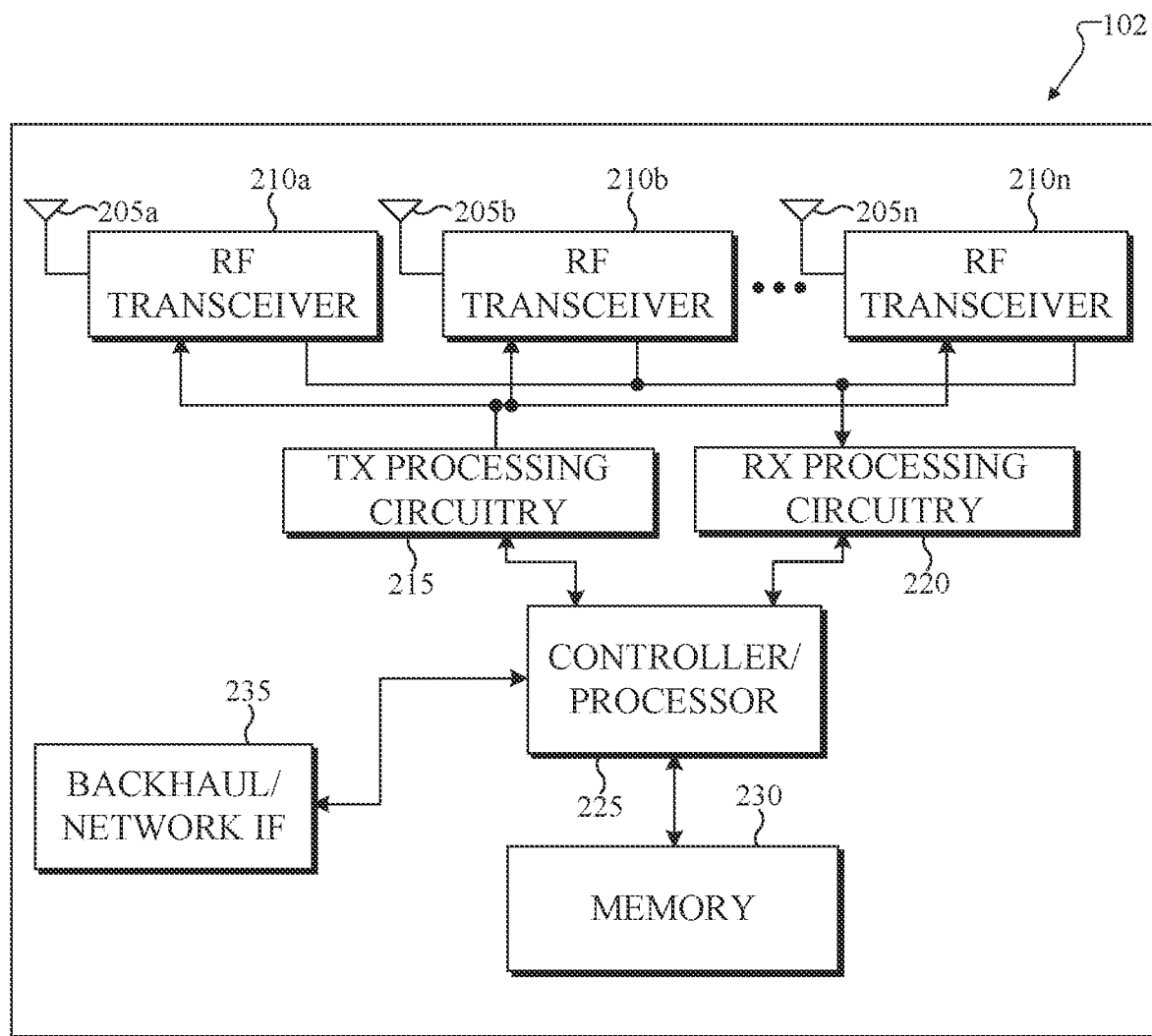
FIG. 2 illustrates an example base station (BS) according to embodiments of the present disclosure.
Figure 3:
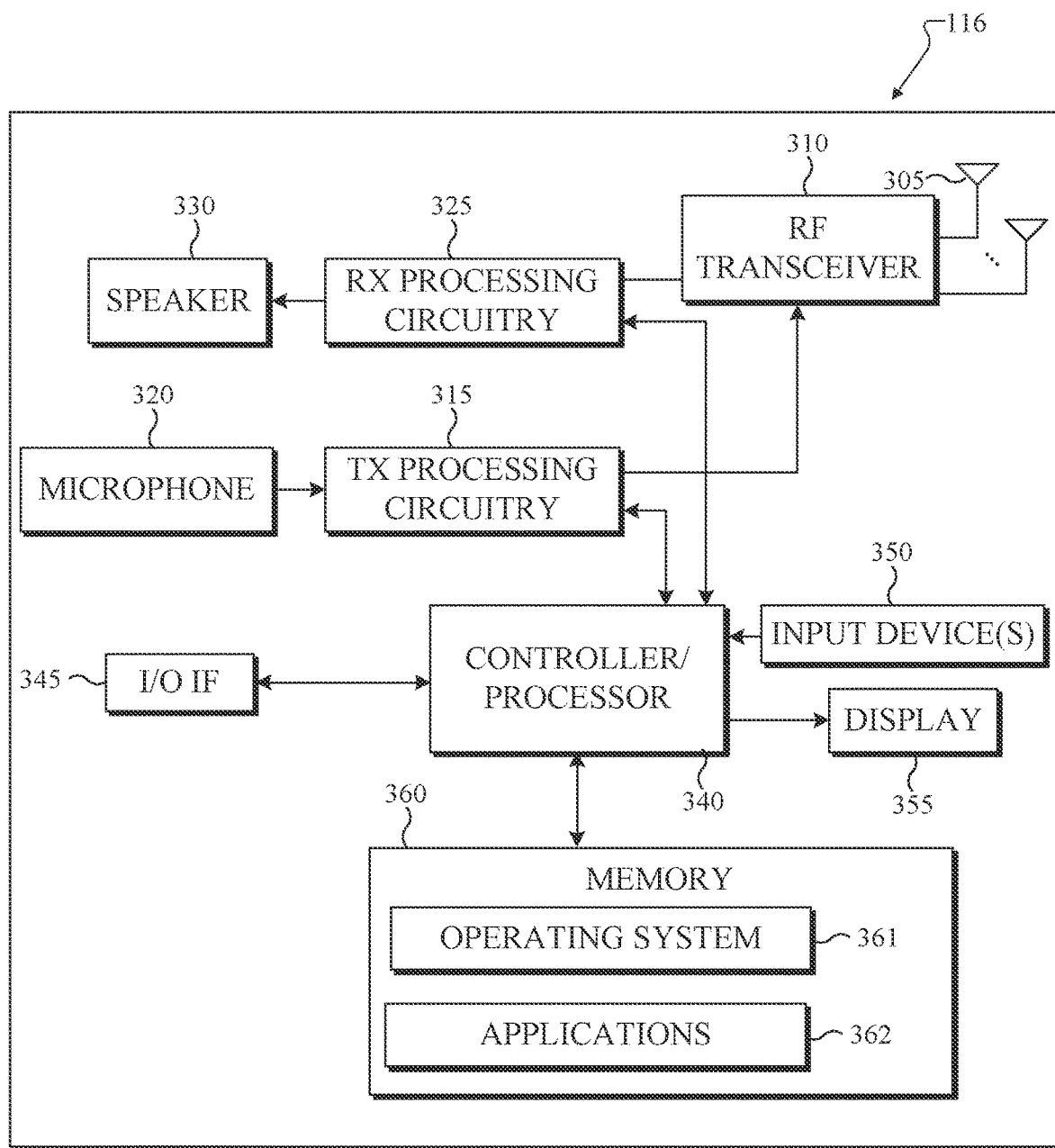
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programing, or a combination thereof for resource allocation for a PUSCH during initial access, resource selection for scheduling uplink transmissions, or a combination thereof. In certain embodiments, and one or more of the BSs 101-103 includes circuitry, programing, or a combination thereof for resource allocation for a PUSCH during initial access, resource selection for scheduling uplink transmissions, or a combination thereof.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support resource allocation for a PUSCH during initial access, resource selection for scheduling uplink transmissions, or a combination thereof. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports communication between entities, such as web real time communications (RTC). For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BS s over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink channel signals and the transmission of downlink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
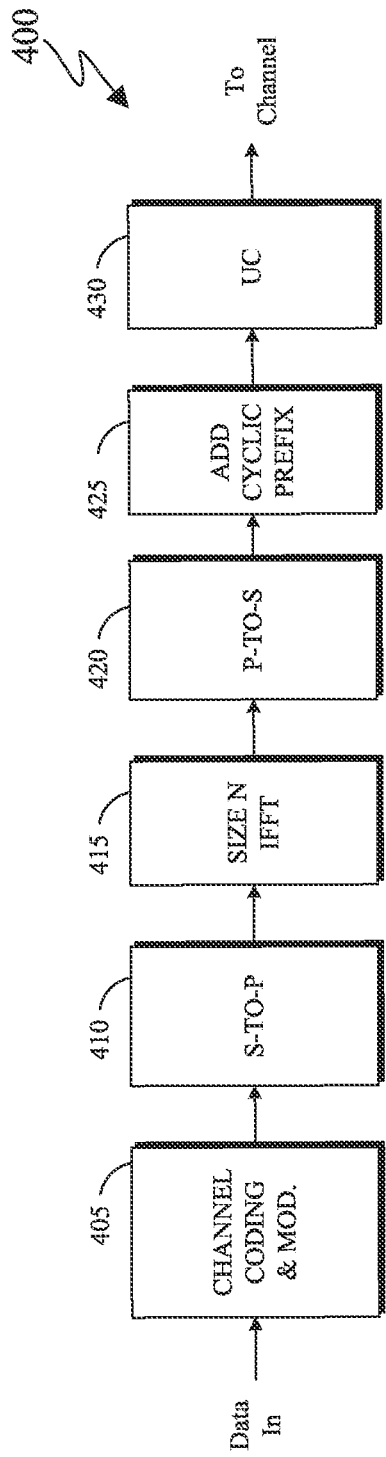
FIGS. 4 and 5 illustrate example wireless transmit and receive paths according to embodiments of the present disclosure.
Figure 5:
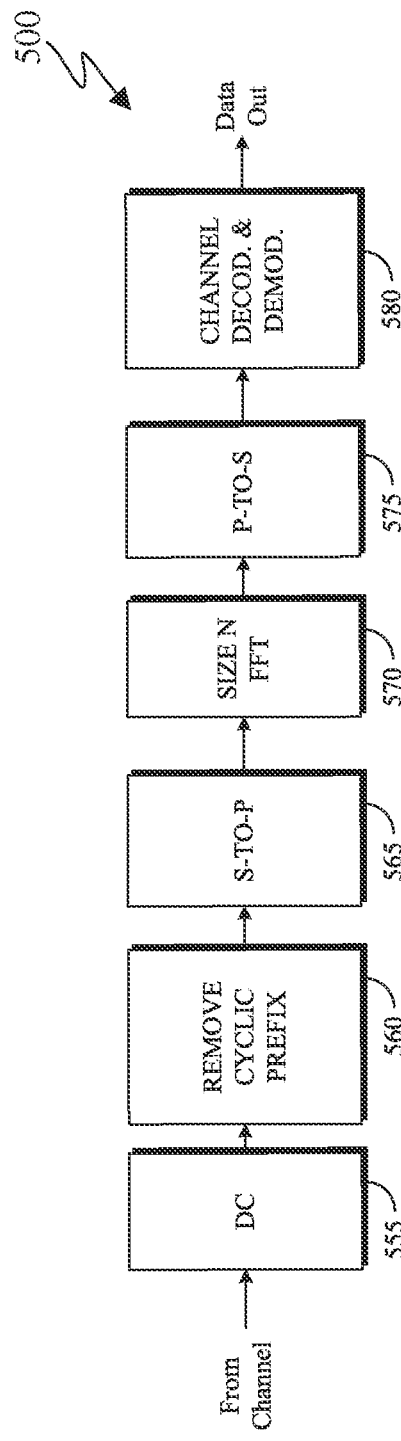

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support resource allocation for a PUSCH during initial access, resource selection for scheduling uplink transmissions, or both, as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In certain embodiments, a number of repetitions for a Msg3 PUSCH transmission are provided to a UE (such as the UE 116) from a gNB (such as the BS 102) by higher layers. For example, a number of Msg3 PUSCH repetitions can be configured by a field in the RRC IE random access channel (RACH)-ConfigCommon that is used to configure cell specific random-access parameters or in RRC IE pusch-ConfigCommon which is used to configure cell specific parameters for PUSCH transmission. The number of repetitions for a Msg3 PUSCH transmission can additionally or alternatively be indicated by a field in a downlink control information (DCI) format scheduling a physical downlink shared channel (PDSCH) reception providing a random access response (RAR) message corresponding to the Msg3 PUSCH transmission, for example by indicating one number of repetitions from a set of numbers of repetitions provided by higher layers. The number of repetitions for a Msg3 PUSCH transmission can additionally or alternatively be indicated by a field in an uplink (UL) grant of the RAR message scheduling a Msg3 PUSCH transmission. The number of repetitions for a Msg3 PUSCH transmission can alternatively be indicated by an entry in a time domain resource assignment (TDRA) table that, in addition to a PUSCH mapping type and a start and a length of a PUSCH transmission in a slot, indicates a number of repetitions for the PUSCH transmission.

Embodiments of the present disclosure relate to a time domain resource allocation for a PUSCH during initial access. Embodiments of the present disclosure also relate to a determination of time domain resources for Msg3 PUSCH transmission from one or more configured TDRA tables. Embodiments of the present disclosure further relate to a determination of time domain resources for PUSCH transmission during initial access and in RRC_CONNECTED state. Embodiments of the present disclosure further relate to a selection of a TDRA table for Msg3 PUSCH transmission by a UE. Additionally, embodiments of the present disclosure relate to a determination of a PRACH resource by the UE from partitions of PRACH resources based on features supported by the UE.

Embodiments in this disclosure can generally apply to the operations of a type or group of UEs in networks with the ability to support multiple service types requiring different requirements for data and control information, and multiple UE types with different capabilities, such as described in FIGS. 6-17, below. In one example, a UE type can be a Reduced Capability (RedCap) UE that supports a maximum bandwidth of 20 MHz for FR1 and 100 MHz for FR2, and may supports either 1 or 2 receive antennas and corresponding maximum downlink (DL) MIMO layers. In another examples, embodiments apply to UEs that support a group of features for coverage enhancement (CE-features) or support a CE-feature of transmission of Msg3 with repetitions. In yet another example, embodiments apply to a RedCap UE that supports CE-features. Embodiments in this disclosure can also generally apply to a PUSCH transmission with repetitions for a Contention Free Random Access (CFRA) PUSCH that is scheduled by RAR UL grant and transmitted by the UE while in CONNECTED state.

In addition to the above embodiments, embodiments in this disclosure also relate to a determination by a UE for repetitions of a Msg3 PUSCH transmission based on a selection by the UE of a resource for initial access. The present disclosure further relates to a determination by a UE for repetitions of a Msg3 PUSCH transmission based on a selection by the UE of resources for a physical random access channel (PRACH) transmission. Additionally, the present disclosure relates to a determination by a UE for repetitions of a Msg3 PUSCH transmission based on a selection by the UE of an UL bandwidth part (BWP) or of a common frequency regions (CFRs) of an UL BWP. These are described in FIGS. 18-24, below.

Embodiments of the present disclosure describe determining a time domain resource allocation form a single or multiple configured TDRA tables. This is described in the following examples and embodiments, such as those of FIGS. 6-8.

Figure 6:
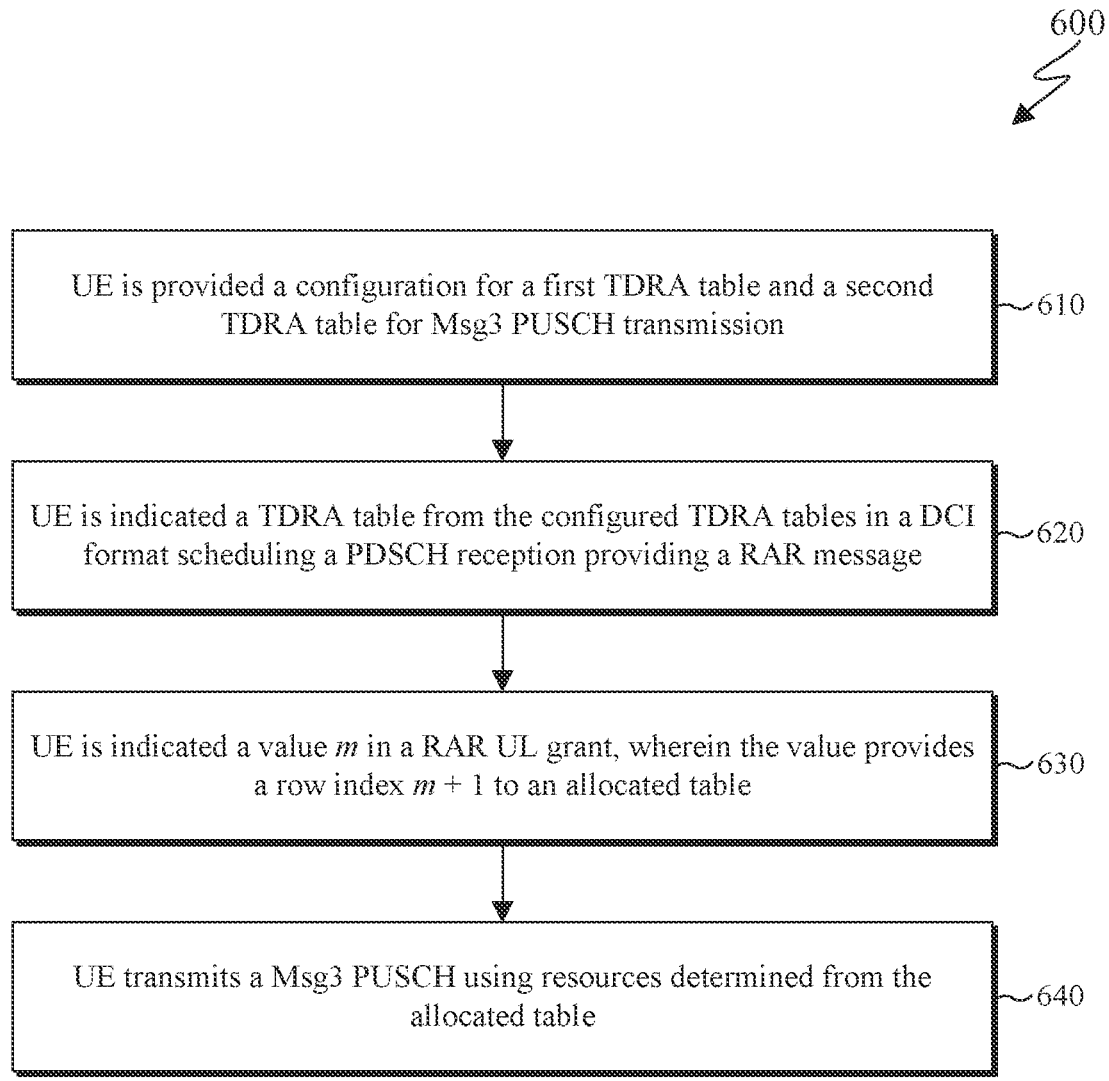
FIGS. 6-11 illustrate example methods for determining a resource allocation in time domain for a Msg3 PUSCH transmission according to embodiments of the present disclosure.
Figure 7:
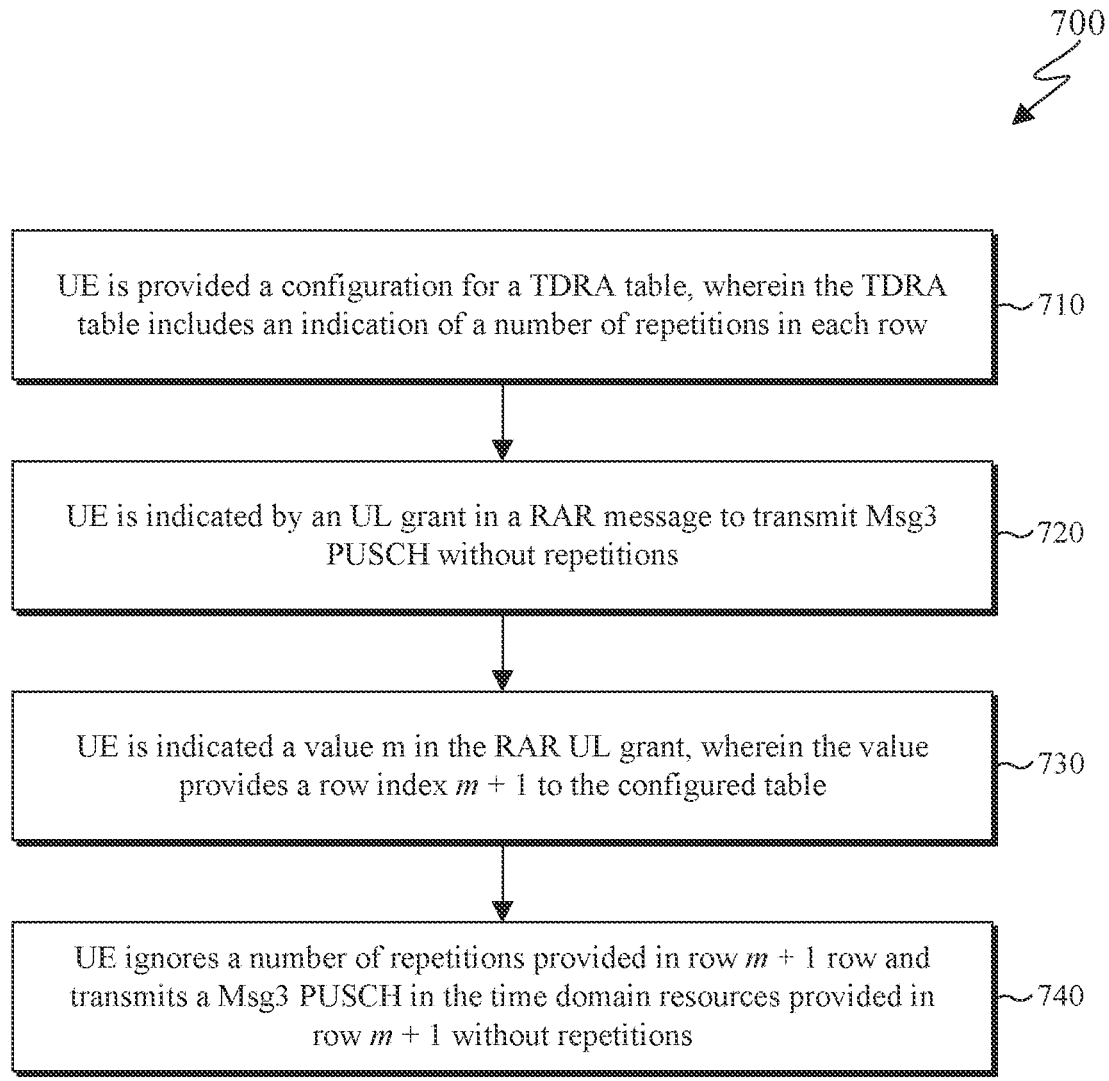
Figure 8:
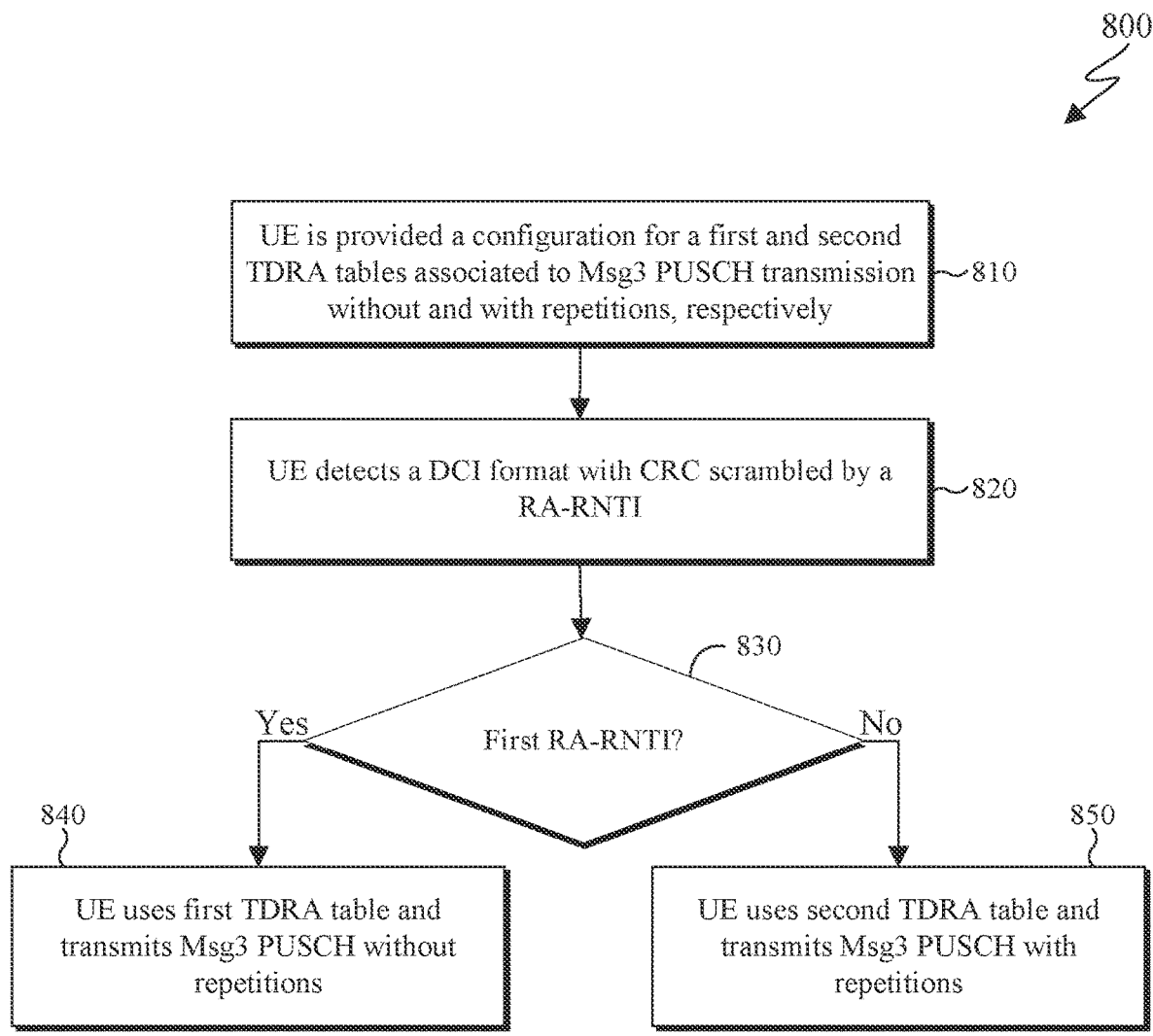

FIGS. 6-8 illustrate example methods 600, 700, and 800, respectively, for determining a resource allocation in time domain for a Msg3 PUSCH transmission according to embodiments of the present disclosure.

The steps of the method 600 of FIG. 6, the method 700 of FIG. 7, and the method 800 of FIG. 8 can be performed by any of the UEs 111-116 of FIG. 1, such as the UE 116 of FIG. 3. The methods 600-800 are for illustration only and other embodiments can be used without departing from the scope of the present disclosure.

In certain embodiments, a gNB (such as the BS 102) can configure to a UE (such as the UE 116) one or more TDRA tables that the UE uses to determine the resource allocation for a Msg3 PUSCH transmission with repetitions. With respect to a TDRA table that does not include a number of repetitions, the TDRA table for Msg3 PUSCH transmission can have an additional column that indicates a number of repetitions for each Msg3 PUSCH transmission resource allocation defined by a row of the table. For example, the number of repetitions can be a value from a range of values {1, 2, 3, 4, 7, 8, 12, 16}. The number of rows of a TDRA table for Msg3 PUSCH with repetitions can be same as a TDRA table for transmission without repetitions, and a 'Time domain resource assignment' field of the DCI can have a same size. The 'Time domain resource assignment' field value m of the DCI provides a row index m+1 to an allocated table for a Msg3 PUSCH transmission. For example, a gNB can configure one TDRA table for a Msg3 PUSCH transmission without repetitions and one TDRA table for a Msg3 PUSCH transmission with repetitions, and indicate in a SIB one of the tables for a UE to use. The indication can additionally or alternatively be provided in a RAR, for example using the UL grant of the RAR. This is advantageous as a gNB can adapt a number of repetitions for Msg3 PUSCH transmission, wherein the number of repetition can be 1 (no repetitions). For example, a gNB can estimate a path loss based on a reception of a PRACH preamble and indicate a TDRA table with larger or smaller values for the number of repetitions or with no repetitions. For example, the estimation of the path-loss can be based on an estimated timing advance (TA) value where a larger TA value can be associated with a larger distance from a UE to the gNB and therefore a larger path-loss.

It is also possible that a gNB (such as the BS 102) identifies whether (i) a UE (such as the UE 116) supports a Msg3 PUSCH transmission with repetitions, (ii) a UE requests to transmit Msg3 PUSCH with repetitions, (iii) a UE requests to transmit Msg3 PUSCH with a configured number of repetitions, from a PRACH preamble that the UE uses to initiate a random access procedure, or a combination thereof. After reception of a PRACH preamble, the gNB can indicate in a RAR a TDRA table to be used for transmission of Msg3 PUSCH.

It is also possible that in a cell where all UEs support transmission of Msg3 PUSCH with repetitions, a gNB (such as the BS 102) can configure a single TDRA table for Msg3 PUSCH transmission, wherein the table includes a column with numbers of repetitions. The gNB can indicate in a RAR message whether a UE should transmit Msg3 PUSCH with a number of repetitions, including no repetitions, given by an entry in the TDRA table row indicated by a row index in RAR.

The indication of a TDRA table that a UE should use can be indicated by a field in a DCI format scheduling a PDSCH reception providing a RAR message that includes an UL grant scheduling the Msg3 PUSCH transmission. Alternatively, indication of a TDRA table that a UE should use can be indicated by a field in the UL grant of the RAR message scheduling the Msg3 PUSCH transmission. The indication in a DCI format scheduling the PDSCH reception providing a RAR, or in an UL grant of the RAR, can be by a 1-bit field indicating one of the two configured TDRA tables.

In certain embodiments, the 1-bit signaling can be an additional bit in the field that indicates a row of the TDRA table. For example, when a TDRA table has 16 rows and a gNB configures two TDRA tables, one for transmission with repetitions and one for transmission without repetitions, a field of 5 bits can be used, wherein a first bit can indicate whether the table with numbers of repetitions or the table without numbers of repetitions should be used, and the remaining 4 bits indicate a row index of the TDRA table indicated by the first bit. When using 5 bits, the contents of the RAR UL grant fields can be rearranged, for example by using a reserved channel state information (CSI) request field of 1 bit as the least significant bit (LSB) of a 5-bit field for the row index of a TDRA table.

In certain embodiments, the 1-bit signaling can also be provided by reserving a bit in the field that indicates a row of the TDRA table. For example, for Msg3 PUSCH transmission, when a TDRA table has 16 rows and a gNB configures two TDRA tables, one for transmission with repetitions and one for transmission without repetitions, a field of 4 bits can be used, wherein a first bit can indicate whether the table with numbers of repetitions or the table without numbers of repetitions should be used, and the remaining 3 bits indicate every other row index of the TDRA table indicated by the first bit for the TDRA table without repetitions. The TDRA table that includes repetitions can include 8 row indexes that can be addressed by the remaining 3 bits.

An indication of which TDRA table a UE should use can be indicated in a RAR by a random access (RA) radio network temporary identifier (RNTI). For example, a RA-RNTI-Msg3rep is associated with an Msg3 PUSCH transmission with repetitions and to a corresponding TDRA table configured in SIB. In response to a PRACH transmission, a UE can detect a DCI format 1_0 with cyclic redundancy check (CRC) scrambled by RA-RNTI-Msg3rep during a window controlled by higher layers and transmit Msg3 PUSCH using time domain resources indicated by the corresponding TDRA table.

In certain embodiments, when an indication of time domain resources for Msg3 PUSCH transmission is a combination of an indication in the SIB and of an indication in a RAR, the indication in the SIB indicates whether to use the TDRA table for Msg3 PUSCH transmission with repetitions or to use the TDRA table for Msg3 PUSCH transmission without repetitions, and the indication in a RAR indicates the row index of the table allocated by the signaling in SIB.

The method 600 as illustrated in FIG. 6 describes an example procedure for a UE to determine a resource allocation in time domain for a Msg3 PUSCH transmission when a gNB configures more than one TDRA tables for Msg3 PUSCH transmission and indicates a TDRA table the UE should use in a DCI format scheduling a PDSCH reception providing a RAR message.

In step 610, a UE (such as the UE 116) is provided a configuration for a first TDRA table and a second TDRA table for Msg3 PUSCH transmission. In step 620, the UE is indicated a TDRA table from the configured TDRA tables in a DCI format scheduling a PDSCH reception providing a RAR message. In step 630, the UE is indicated a value m in a RAR UL grant, wherein the value provides a row index m+1 to an allocated table. In step 640, the UE transmits a Msg3 PUSCH using resources determined from the allocated table. Alternatively, in certain embodiments, the indication at step 620 can be in the SIB.

The method 700 as illustrated in FIG. 7 describes an example procedure for a UE to determine a resource allocation in time domain for a Msg3 PUSCH transmission when a gNB configures a single TDRA table for Msg3 PUSCH transmission.

In step 710, a UE (such as the UE 116) is provided a configuration for a TDRA table, wherein the TDRA table includes an indication of a number of repetitions in each row. In step 720, the UE is indicated by an UL grant in a RAR message to transmit Msg3 PUSCH without repetitions. In step 730, the UE is indicated a value m in the RAR UL grant, wherein the value provides a row index m+1 to the configured table. In step 740, the UE ignores a number of repetitions provided in row m+1 row and transmits a Msg3 PUSCH in the time domain resources provided in row m+1 without repetitions.

The method 800 as illustrated in FIG. 8 describes an example procedure for a UE to determine a resource allocation in time domain for a Msg3 PUSCH transmission when a gNB configures more than one TDRA tables for Msg3 PUSCH transmission and indicates a TDRA table the UE should use through the RA-RNTI that scrambles the CRC of a DCI format in RAR.

In step 810, a UE (such as the UE 116) is provided a configuration for a first TDRA table and a second TDRA table, wherein the first table is associated to Msg3 PUSCH transmission with repetitions and the second table is associated to Msg3 PUSCH transmission with no repetitions. In step 820, the UE detects a DCI format with CRC scrambled by a RA-RNTI. In step 830, the UE determines whether the RA-RNTI is a first RA-RNTI or a second RA-RNTI. When the RA-RNTI is a first RA-RNTI (as determined in step 830), the UE in step 840 uses the first TDRA table and transmits the Msg3 PUSCH without repetitions. Alternatively, when the RA-RNTI is a second RA-RNTI (as determined in step 830), the UE in step 850 uses the second TDRA table and transmits the Msg3 PUSCH with repetitions.

Although FIG. 6 illustrates the method 600, FIG. 7 illustrates the method 700, and FIG. 8 illustrates the method 800 various changes may be made to FIGS. 6-8. For example, while the methods 600-800 are shown as a series of steps, various steps could overlap, occur in parallel, occur in a different order, or occur multiple times. In another example, steps may be omitted or replaced by other steps. For example, steps of the methods 600-800 can be executed in a different order.

Embodiments of the present disclosure also describe determining a time domain resource allocation form multiple configured TDRA tables for transmission with repetitions. This is described in the following examples and embodiments, such as those of FIG. 9.

Figure 9:
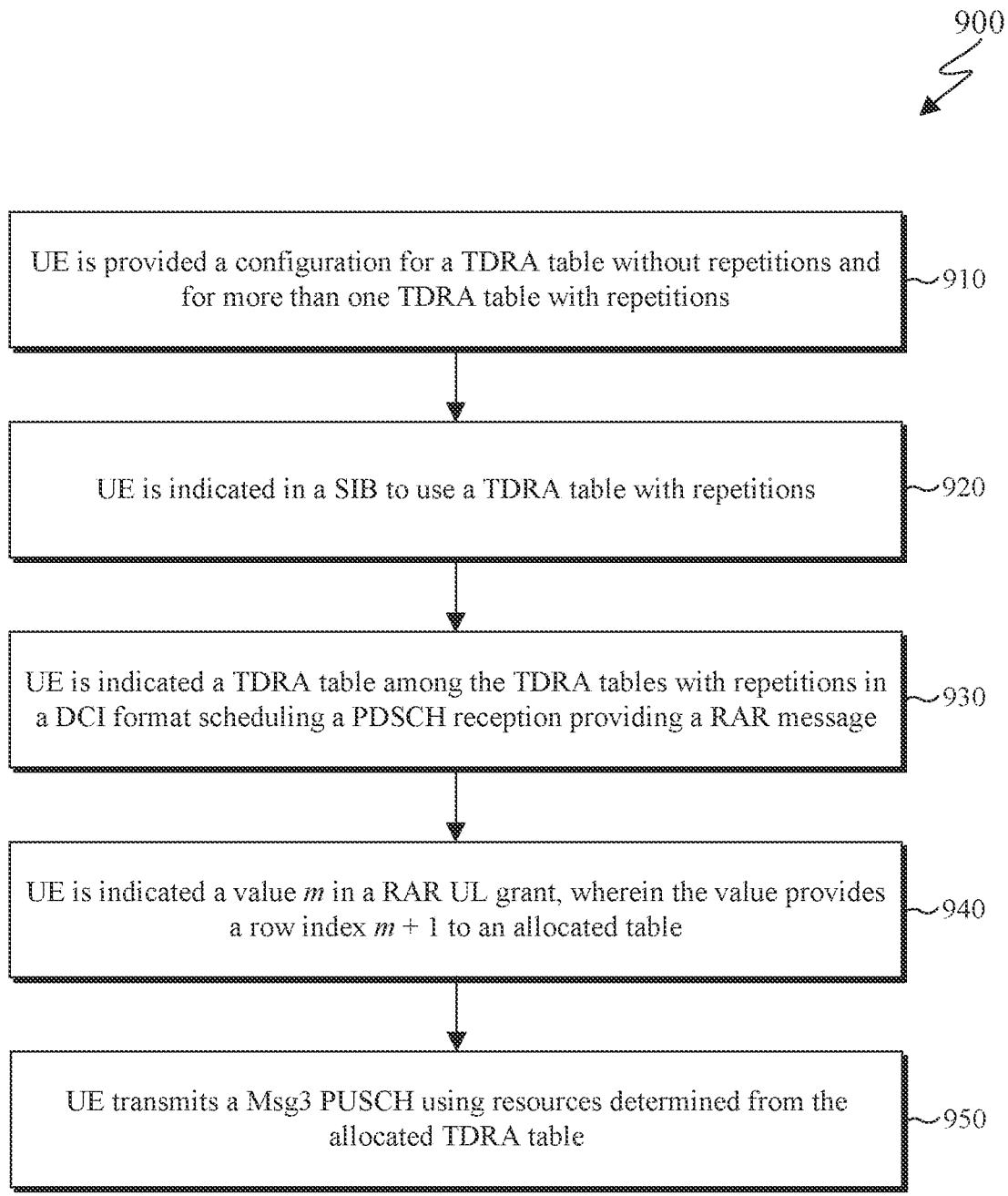

FIG. 9 illustrates an example method 900 for determining a resource allocation in time domain for a Msg3 PUSCH transmission according to embodiments of the present disclosure.

The steps of the method 900 of FIG. 9 can be performed by any of the UEs 111-116 of FIG. 1, such as the UE 116 of FIG. 3. The method 900 is for illustration only and other embodiments can be used without departing from the scope of the present disclosure.

In certain embodiments, a gNB (such as the BS 102) can configure more than one TDRA table for a Msg3 PUSCH transmission with repetitions and a TDRA table for a Msg3 PUSCH transmission without repetitions, wherein a number of rows of the configured TDRA tables is same. The gNB can indicate in SIB whether a UE should use a TDRA table for transmission with or without repetitions, and when applicable indicate one of the TDRA tables with repetitions in a DCI format scheduling a PDSCH reception providing a RAR message. An indication of the row index of a TDRA table can be indicated in a RAR UL grant, wherein the indication is a field of m bits for a TDRA table with repetitions and for a TDRA table without repetitions.

The method 900 as illustrated in FIG. 9 describes an example procedure for a UE to determine a resource allocation in time domain for a Msg3 PUSCH transmission when a gNB configures more than one TDRA table for the Msg3 PUSCH transmission with repetitions.

In step 910, a UE (such as the UE 116) is provided a configuration for a TDRA table without repetitions and for more than one TDRA table with repetitions. In step 920, the UE is indicated in a SIB to use a TDRA table with repetitions. In step 930, the UE is indicated a TDRA table among the TDRA tables with repetitions in a DCI format scheduling a PDSCH reception providing a RAR message. In step 940, the UE is indicated a field value m in a RAR UL grant, wherein the value provides a row index m+1 to an allocated table. In step 940, the UE transmits a Msg3 PUSCH using resources determined from the allocated TDRA table.

Although FIG. 9 illustrates the method 900 various changes may be made to FIG. 9. For example, while the method 900 is shown as a series of steps, various steps could overlap, occur in parallel, occur in a different order, or occur multiple times. In another example, steps may be omitted or replaced by other steps. For example, steps of the method 900 can be executed in a different order.

Embodiments of the present disclosure also describe determining a time domain resource allocation for PUSCH transmission during initial access in RRC_CONNECTED state. This is described in the following examples and embodiments, such as those of FIG. 10.

Figure 10:
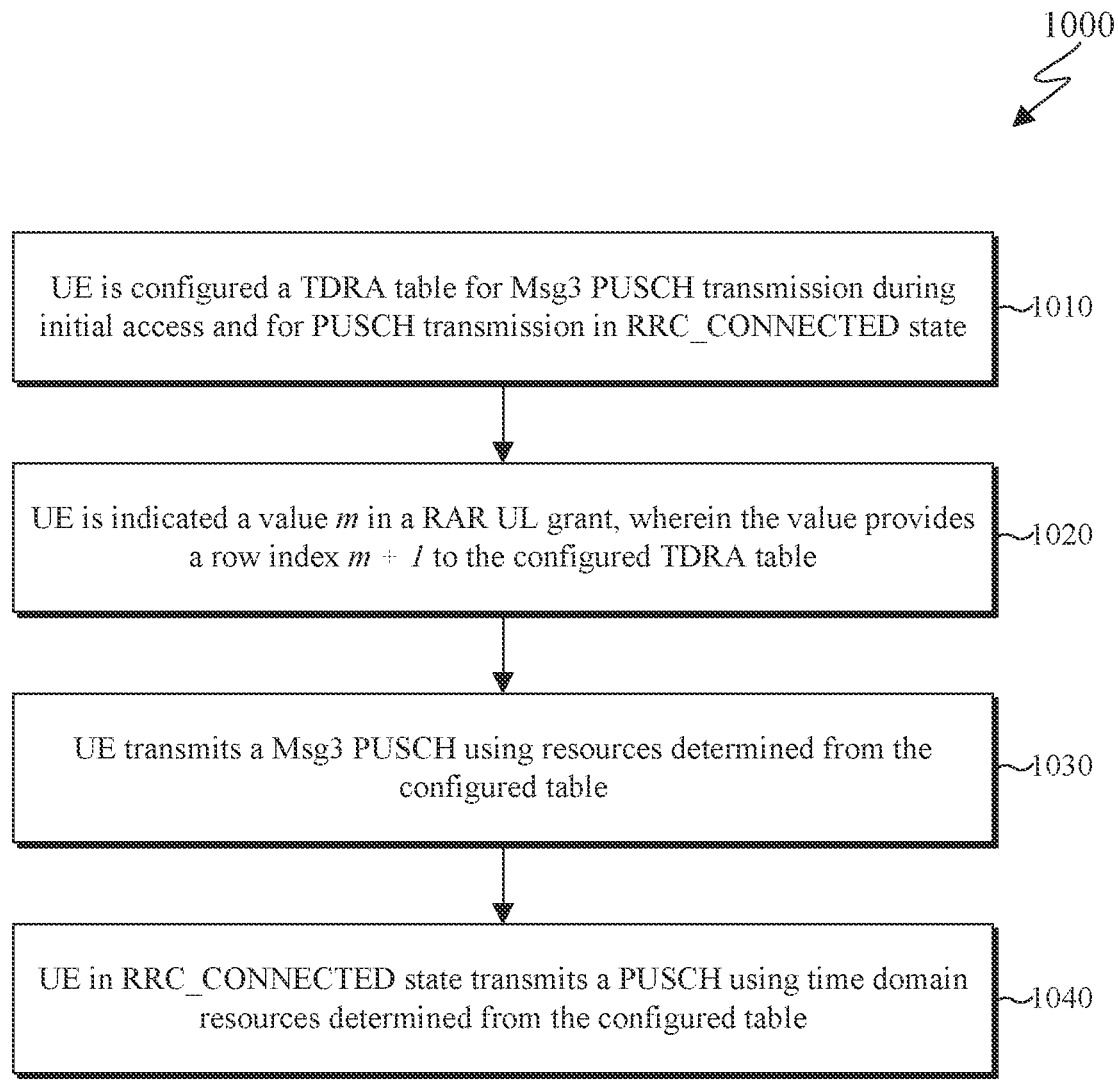

FIG. 10 illustrates an example method 1000 for determining a resource allocation in time domain for a Msg3 PUSCH transmission according to embodiments of the present disclosure.

The steps of the method 1000 of FIG. 10 can be performed by any of the UEs 111-116 of FIG. 1, such as the UE 116 of FIG. 3. The method 1000 is for illustration only and other embodiments can be used without departing from the scope of the present disclosure.

In certain embodiments, a gNB (such as the UE 116) can configure a TDRA table for a Msg3 PUSCH transmission during initial access and another TDRA table for a PUSCH transmission in RRC_CONNECTED state. Here, the PUSCH transmission in RRC_CONNECTED state can be a CFRA PUSCH scheduled by RAR UL grant or a PUSCH transmission scheduled by a DCI format scrambled by a C-RNTI. It is also possible that a single TDRA table can be used for transmission of Msg3 PUSCH during initial access and for transmission of PUSCH in RRC_CONNECTED state. Such TDRA table can have a larger number of rows relative to a default TDRA table defined for Msg3 transmission without repetitions. For example, a field of 4 bits in a RAR UL grant can indicate a row of a default TDRA table for Msg3 PUSCH transmission without repetitions, and a field of 5 bits can indicate a row of a TDRA table for PUSCH transmission in RRC_CONNECTED state. When a gNB configures a same TDRA table for Msg3 PUSCH transmission and for PUSCH transmission in RRC_CONNECTED state, in order to use 4 bits for the PUSCH time resource allocation field of the RAR grant, only part of the TDRA table for RRC_CONNECTED state can be used. For example, for the TDRA table for RRC_CONNECTED state, only the first half of the rows, or only the second half of the rows, or every other row can be used for Msg3 PUSCH transmission. Alternatively, 5 bits can be used for the PUSCH time resource allocation field of the RAR grant and all rows of the TDRA table can be used for Msg3 PUSCH transmission. The contents of the RAR UL grant fields can be rearranged by using a 5 bits for the PUSCH time resource allocation field. For example, a CSI request field that is reserved is used as for PUSCH time resource allocation.

The method 1000 as illustrated in FIG. 10 describes an example procedure for a UE to determine a resource allocation in time domain for a Msg3 PUSCH transmission when a gNB configures more than one TDRA table for Msg3 PUSCH transmission with repetitions.

In step 1010, a UE (such as the UE 116) is configured a TDRA table for Msg3 PUSCH transmission during initial access and for PUSCH transmission in RRC_CONNECTED state. In step 1020, the UE is indicated a field value m in a RAR UL grant, wherein the value provides a row index m+1 to the configured table. In step 1030, the UE transmits a Msg3 PUSCH using time domain resources determined from the configured table. In step 1040, the UE in RRC_CONNECTED state transmits a PUSCH using time domain resources determined from the configured table.

Although FIG. 10 illustrates the method 1000 various changes may be made to FIG. 10. For example, while the method 1000 is shown as a series of steps, various steps could overlap, occur in parallel, occur in a different order, or occur multiple times. In another example, steps may be omitted or replaced by other steps. For example, steps of the method 1000 can be executed in a different order.

Embodiments of the present disclosure also describe a selection of a TDRA table for Msg3 PUSCH transmission by a UE. This is described in the following examples and embodiments, such as those of FIGS. 11-17.

Figure 11:
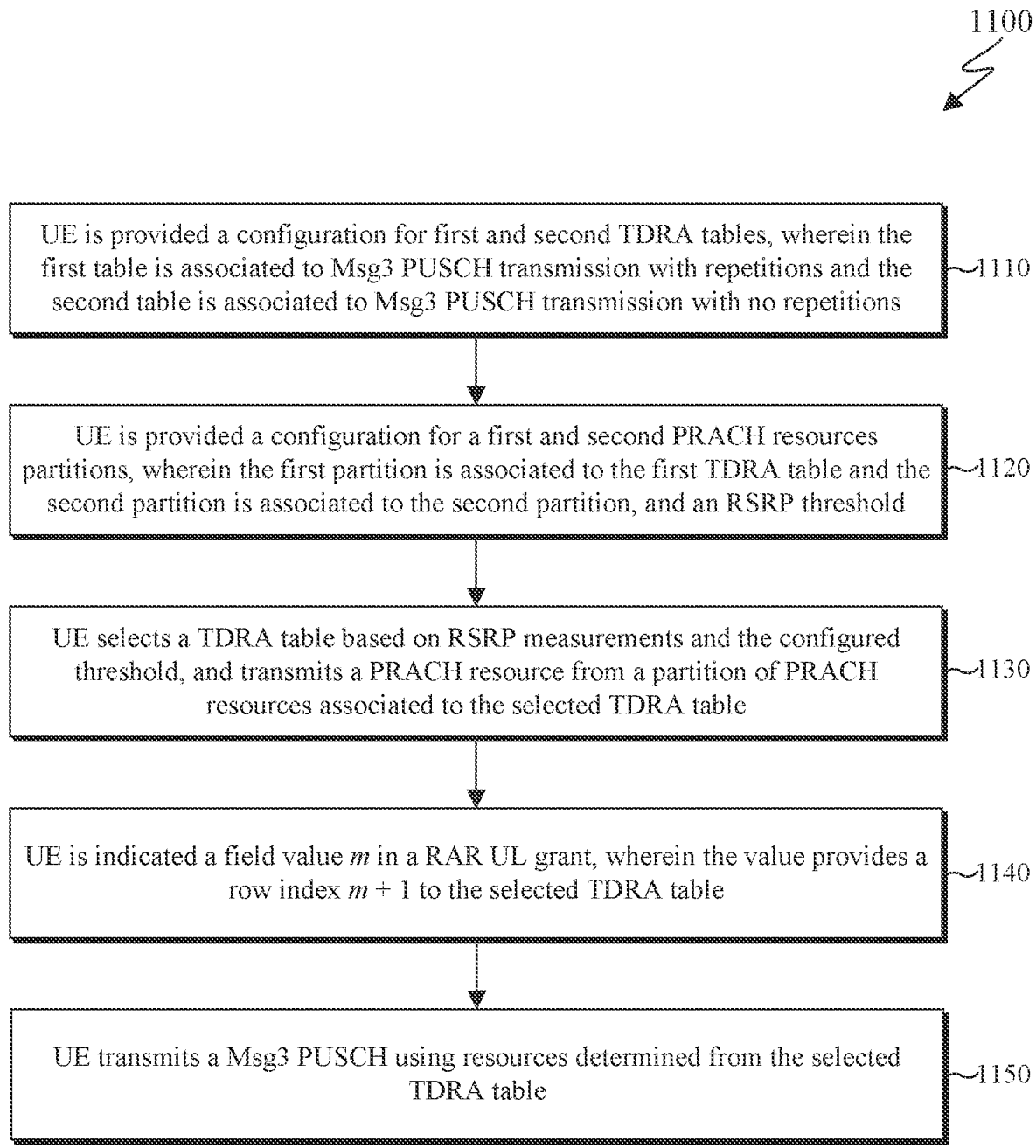
Figure 12:
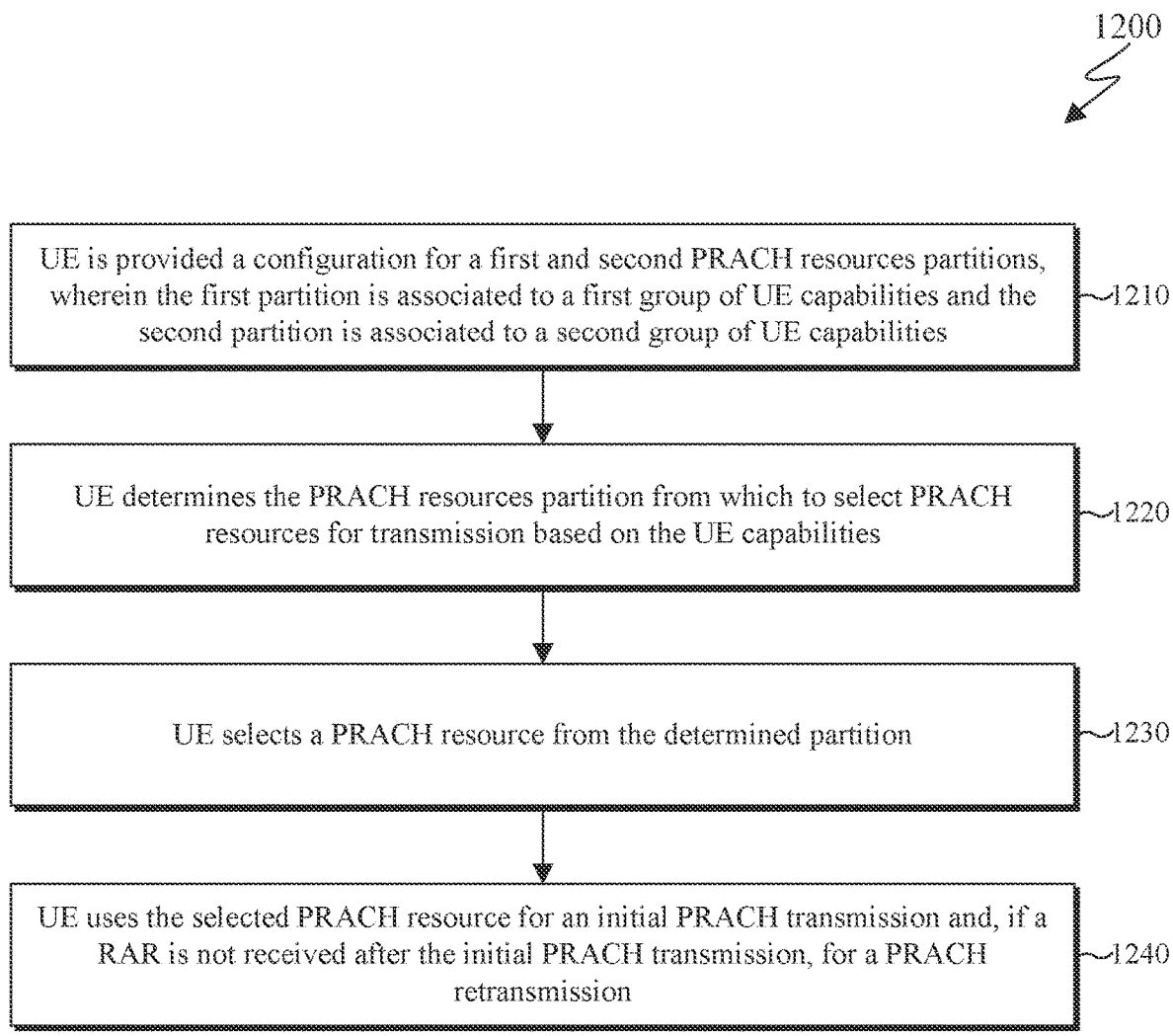
FIG. 12 illustrates an example method for selecting a physical random access channel (PRACH) resource the UE uses for initial PRACH transmission and retransmission according to embodiments of the present disclosure.
Figure 13:
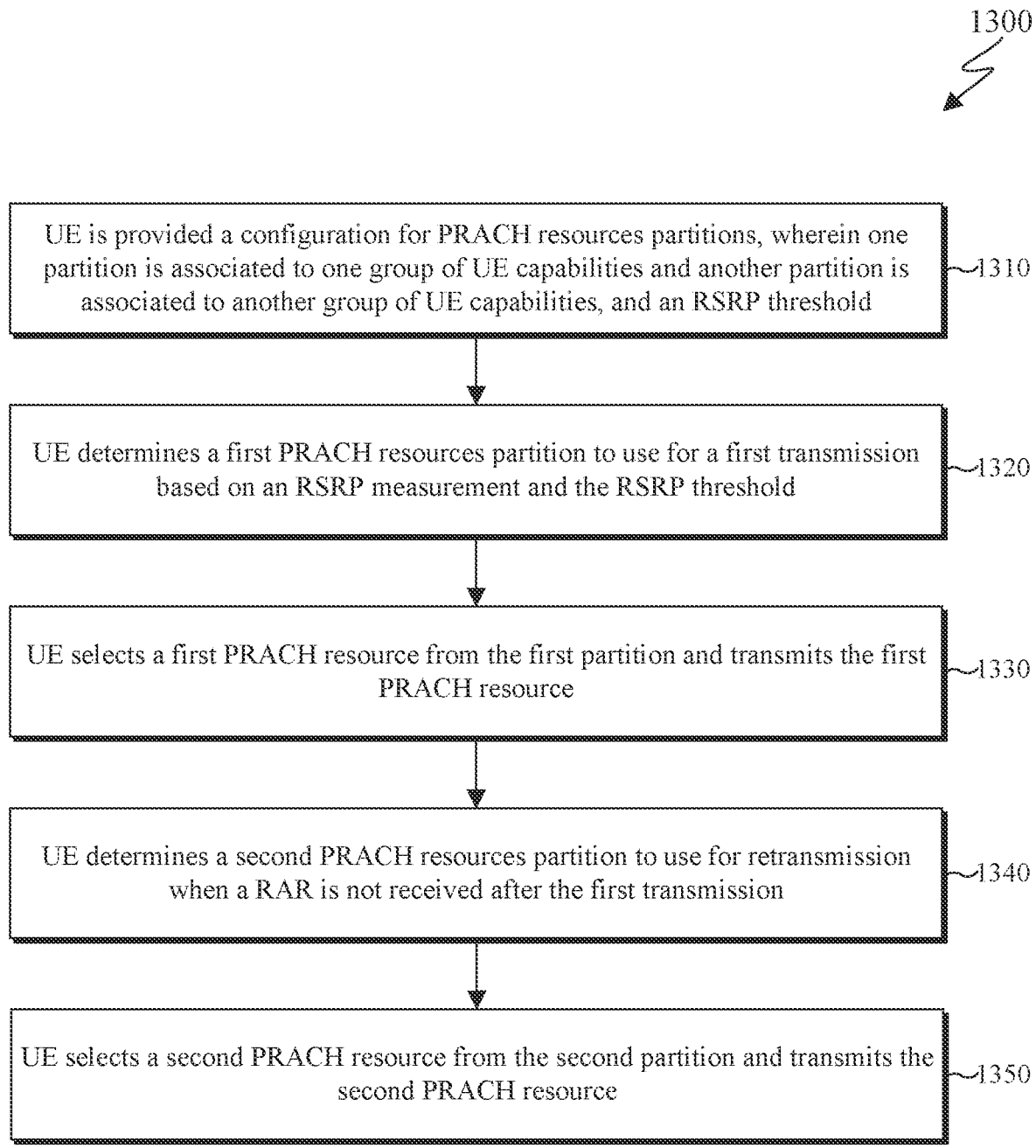
FIG. 13 illustrates an example method for selecting a PRACH resource for initial transmission from a first partition and a PRACH resource for a PRACH retransmission from a second partition according to embodiments of the present disclosure.
Figure 14:
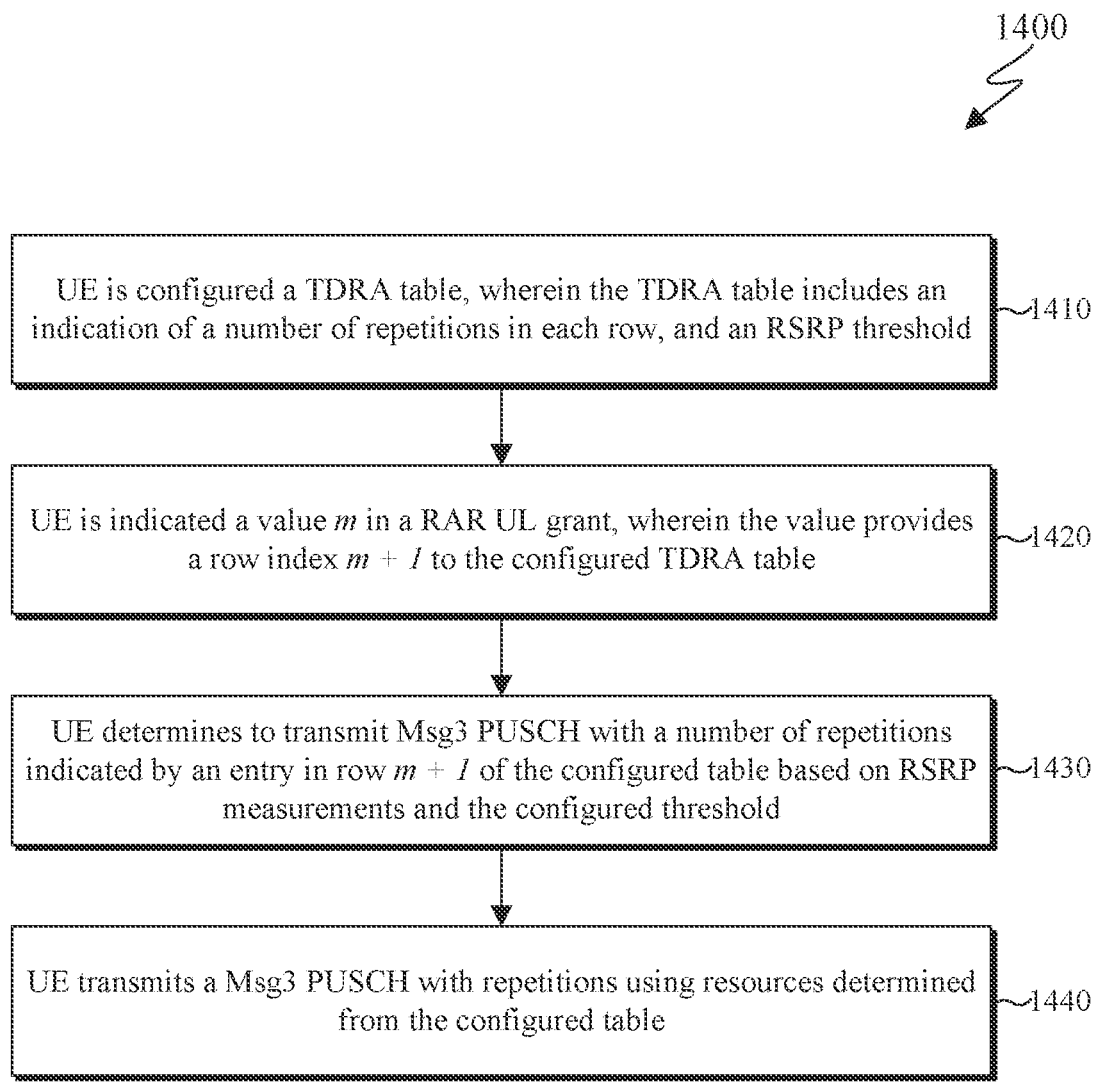
FIGS. 14 and 15 illustrate example methods for determining a resource allocation in time domain for a Msg3 PUSCH transmission according to embodiments of the present disclosure.
Figure 15:
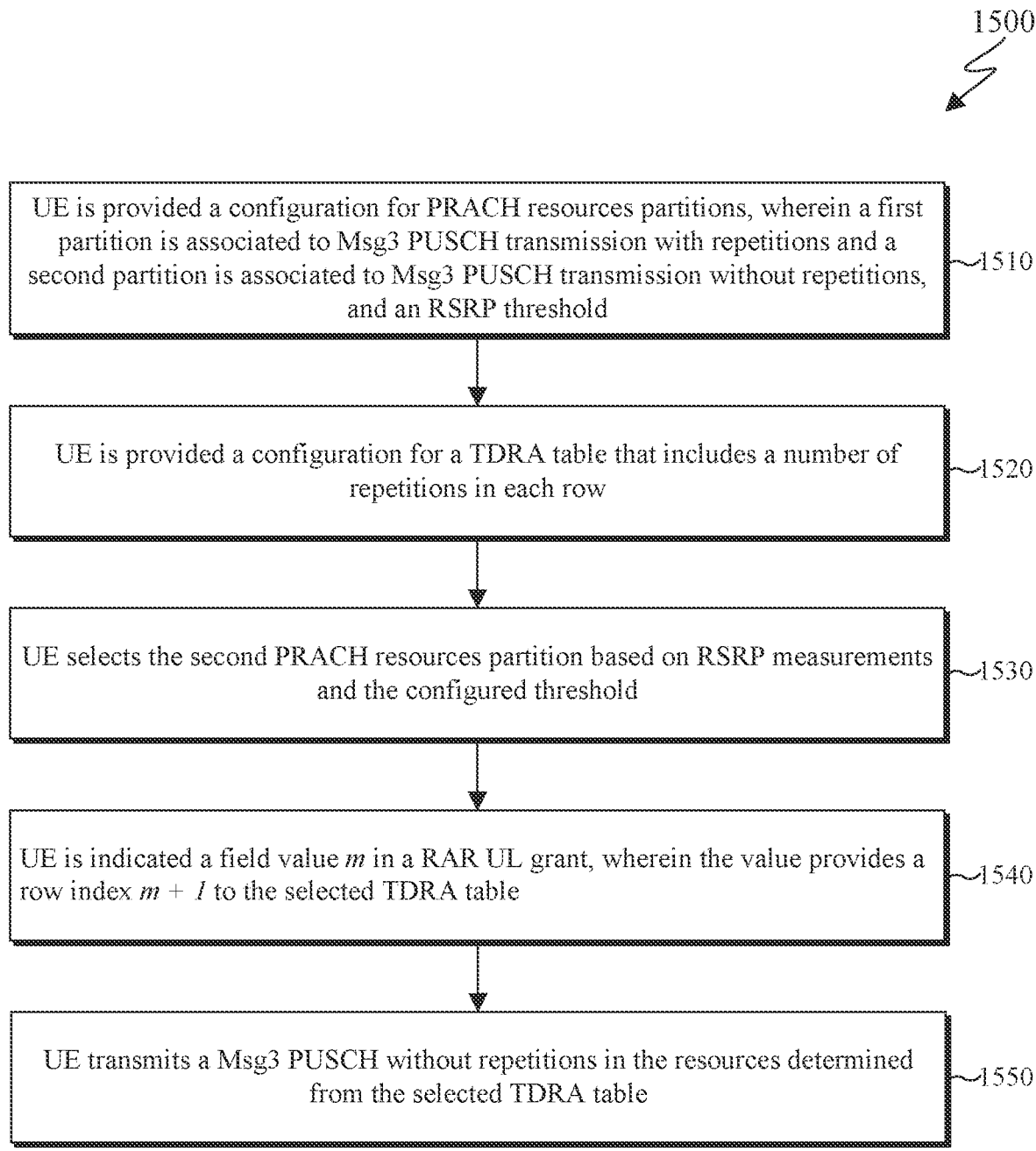
Figure 16:
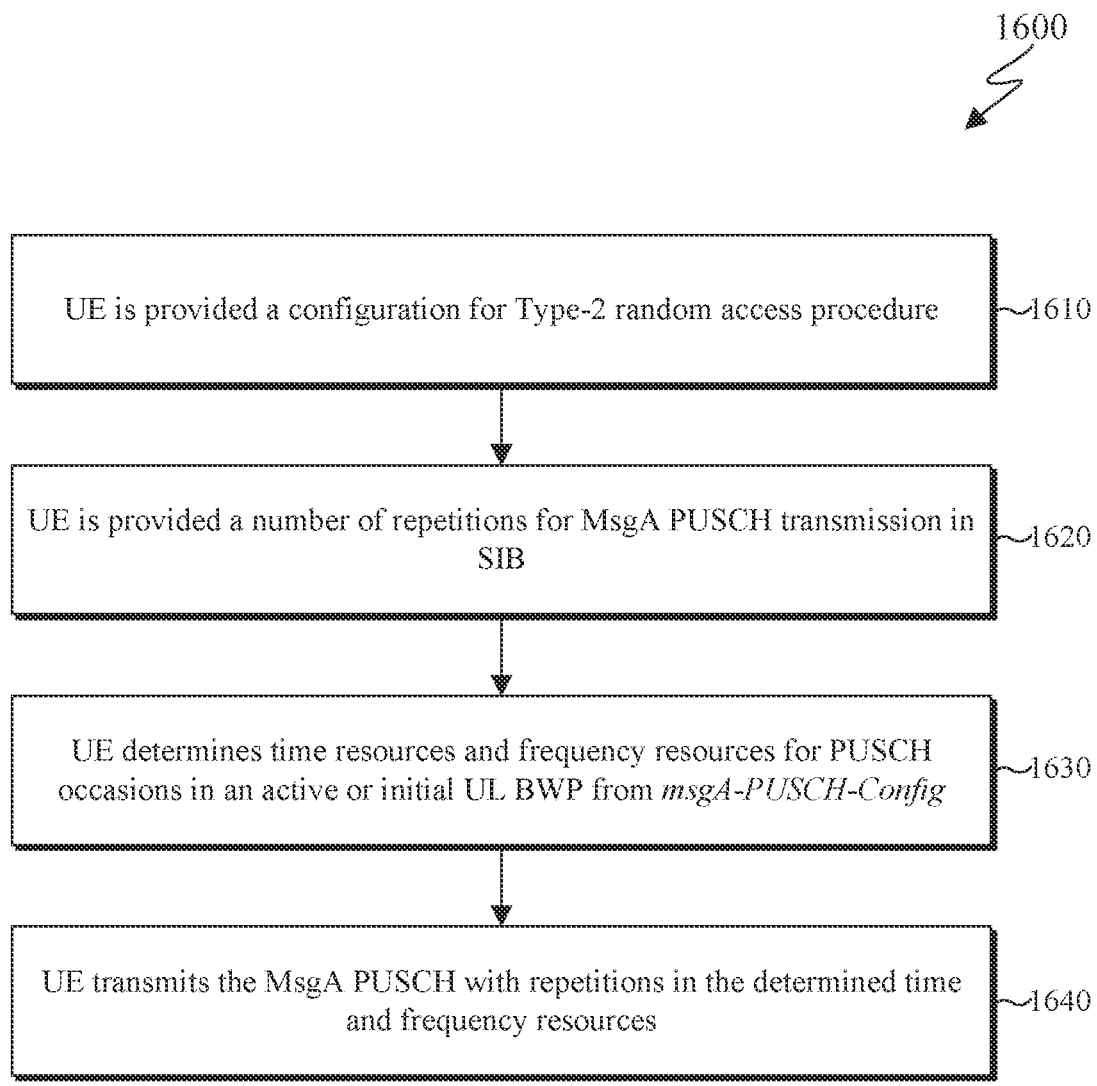
FIGS. 16 and 17 illustrate example methods for determining a MsgA PUSCH transmission according to embodiments of the present disclosure.
Figure 17:
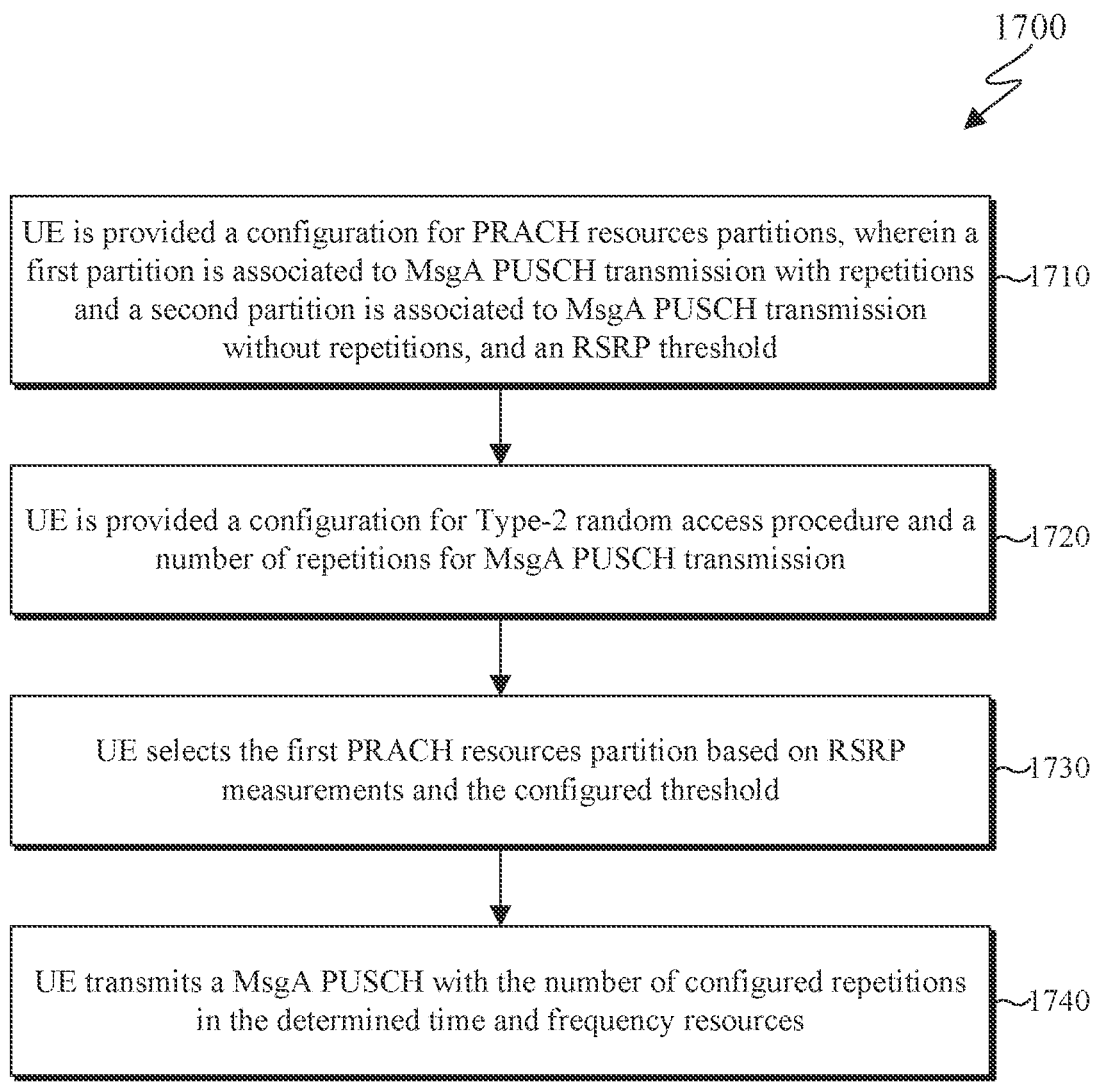

FIG. 11 illustrates an example method 1100 for determining a resource allocation in time domain for a Msg3 PUSCH transmission according to embodiments of the present disclosure. FIG. 12 illustrates an example method 1200 for selecting a PRACH resource the UE uses for initial PRACH transmission and retransmission according to embodiments of the present disclosure. FIG. 13 illustrates an example method 1300 for selecting a PRACH resource for initial transmission from a first partition and a PRACH resource for a PRACH retransmission from a second partition according to embodiments of the present disclosure. FIGS. 14 and 15 illustrate example methods 1400 and 1500, respectively, for determining a resource allocation in time domain for a Msg3 PUSCH transmission according to embodiments of the present disclosure. FIGS. 16 and 17 illustrate example methods 1600 and 1700, respectively, for determining a MsgA PUSCH transmission according to embodiments of the present disclosure.

The steps of the method 1100 of FIG. 11, the method 1200 of FIG. 12, the method 1300 of FIG. 13, the method 1400 of FIG. 14, the method 1500 of FIG. 15, the method 1600 of FIG. 16, and the method 1700 of FIG. 17 can be performed by any of the UEs 111-116 of FIG. 1, such as the UE 116 of FIG. 3. The methods 1100-1700 are for illustration only and other embodiments can be used without departing from the scope of the present disclosure.

A gNB (such as the BS 102) can configure more than one TDRA table that a UE (such as the UE 116) can use to determine a resource allocation for a Msg3 PUSCH transmission, and configure partitions of PRACH resources associated to the TDRA tables. One table can be associated to Msg3 transmission without repetitions and one or more tables can be associated to Msg3 transmission with repetitions, or all tables can be associated to Msg3 with repetitions. A UE can select one of the configured TDRA tables and transmit a PRACH preamble in a RACH occasion (RO) or in a set of ROs selected from the PRACH resources associated to the selected TDRA table. The RO or the set of ROs can be used by any of the preambles of the different partitions.

After reception of the PRACH preamble, the gNB can schedule a Msg3 transmission in an allocated resource, wherein resource allocation is done using the selected TDRA table. The UE then transmits a Msg3 PUSCH according to the indication of a PUSCH time resource allocation field in RAR from the selected table. A gNB (such as the UE 116) can also configure in a SIB one or more reference signal received power (RSRP) thresholds that a UE can use to select a TDRA table from the TDRA tables configured in the SIB.

The method 1100 of FIG. 11 describes an example procedure for a UE to determine a resource allocation in time domain for Msg3 PUSCH transmission by selecting a TDRA table from the configured TDRA tables in SIB.

In step 1110, a UE (such as the UE 116) is provided a configuration for first and second TDRA tables, wherein the first table is associated to a Msg3 PUSCH transmission with repetitions and the second table is associated to a Msg3 PUSCH transmission with no repetitions.

In step 1120, the UE is provided a configuration for a first and second PRACH resources partitions. Here a first partition is associated to the first TDRA table and a second partition is associated to the second partition, and an RSRP threshold. The partition can be based on (i) PRACH preambles or (ii) PRACH preambles and ROs. In certain embodiments, the RSRP threshold that the UE uses to select a PRACH resources or preambles partition is associated to a Msg3 PUSCH transmission (step 1120). Here the Msg3 transmission can be with or without repetitions. The threshold can be same as the threshold rsrp-ThresholdSSB configured in RACH-ConfigCommon IE that the UE may use to select the SS block. The SS block may (or may not) be associated with a remaining minimum system information (RMSI), and corresponding PRACH resource for path-loss estimation and (re)transmission based on SS blocks that satisfy the threshold or can be a different threshold rsrp-ThresholdSSB-Msg3rep configured in RACH-ConfigCommon IE.

In step 1130, the UE selects a TDRA table based on RSRP measurements and the configured threshold. Thereafter the UE transmits a PRACH resource from a partition of PRACH resources associated to the selected TDRA table. The RSRP measurements can be based on a synchronized signal (SS)/physical broadcast channel (PBCH) block (SSB) or on a CSI-RS. The SS/PBCH can be a cell-defining SSB (CD-SSB) or a non-cell defining SSB (NCD-SSB).

In step 1140, the UE is indicated a value m in a RAR UL grant, wherein the value provides a row index m+1 to the selected TDRA table. In step 1150, the UE transmits a Msg3 PUSCH using resources determined from the selected TDRA table.

In certain embodiments, for a Type-2 random access procedure, when a PRACH resources or preambles partition is associated to a MsgA PUSCH transmission (wherein the MsgA PUSCH transmission can be with or without repetitions), the RSRP threshold that the UE may use to select a PRACH resource from a PRACH resources or preambles partition associated to a MsgA PUSCH transmission with repetitions, can be same as the threshold msgA-RSRP-ThresholdSSB configured in RACH-ConfigCommonTwoStepRA-r16 IE that the UE may use to select the SS block. The SS block may or may not be associated with an RMSI, and corresponding PRACH resource for path-loss estimation and (re)transmission based on SS blocks that satisfy the threshold or can be a different threshold msgA-RSRP-ThresholdSSB-rep configured in RACH-ConfigCommonTwoStepRA-r16 IE.

When a UE is provided a configuration for first and second PRACH resources or preambles partitions, the UE can determine whether to select a PRACH resource from the first PRACH resources or preambles partition or from the second PRACH resources or preambles partition based on an RSRP measurement. In this example, one of the following four options can define the first and second PRACH. In a first example, the first PRACH resources or preambles partition can be associated to a first TDRA table and the second PRACH resources or preambles partition can be associated to a second TDRA table. For a second example, the first PRACH resources or preambles partition can be associated to a Msg3 PUSCH transmission with repetitions and the second PRACH resources or preambles partition can be associated to a Msg3 PUSCH transmission without repetitions. For a third example, the first PRACH resources or preambles partition can be associated to a MsgA PUSCH transmission with repetitions and the second PRACH resources or preambles partition can be associated to a MsgA PUSCH transmission without repetitions. For a fourth another example, the first PRACH resources or preambles partition can be a partition A for use by a first UE type or a first group of UE types and the second PRACH resource partition can be a partition B for use by a second UE type or a second group of UE types, wherein the first UE type can be a RedCap UE and the second UE type can be a non-RedCap UE.

In the above embodiment, the RSRP measurements can be based on an SS/PBCH block or on a CSI-RS. The SS/PBCH can be (i) a CD-SSB or an NCD-SSB, (ii) based on a UE type, (iii) based on a UE capability, (iii) based on an information in SIB, or (iv) based on any combination thereof. When the UE determines the PRACH resources or preambles partition from which to select a PRACH resource, the PRACH resources in the selected partition are available for the initial transmission and retransmission, if any. For example, the UE selects a PRACH resource from the determined partition and transmits the selected PRACH preamble in an RO. When the UE does not receive a RAR after transmitting the PRACH, the UE may retransmit using the same PRACH resource. It is possible that when the UE does not receive a RAR after transmitting a first PRACH resource, the UE uses a second PRACH resource that belongs to the same PRACH resources partition of the first PRACH resource. A partition of PRACH resources is provided per carrier or per UL BWP.

In certain embodiments, when a partition of PRACH resources is associated to a UE type (for example, a PRACH resources or preambles partition A is for RedCap UEs and a PRACH resources or preambles partition B is for non-RedCap UEs, or to a UE capability, for example, a PRACH resource partition A is for UEs supporting a coverage enhancement (CE) feature or a group of CE features and a PRACH resource partition B is for UEs not supporting the CE feature or the group of CE features of partition A), for PRACH retransmission after the initial PRACH transmission the UE uses the same PRACH resource or a different resource from the same partition. A PRACH resource can comprise one or more PRACH preambles associated to one or more ROs, wherein the mapping between PRACH preambles and ROs can be a 1-to-1 or a 1-to-N mapping. Alternatively, initial PRACH transmission and PRACH retransmission can be resources from different partitions. For example, when a UE is provided a configuration for a first and second PRACH resources or preambles partitions, wherein the first PRACH resources or preambles partition is associated to non-CE features and the second PRACH resource partition is associated to CE features, if the initial transmission with a PRACH resource from the first partition fails, the UE can use a PRACH resource from the second partition for retransmission. Whether initial PRACH transmission and PRACH retransmission use same or different PRACH resources from different PRACH resources or preambles partitions can be configured in SIB.

When a partition of PRACH resources is associated to more than one aspect or capability of a UE, (for example it is associated to a UE type (for example to RedCap UEs) and to a group of UE features (for example CE features)), the RSRP threshold that the UE uses to select a PRACH resource among the PRACH resources of the partition is unique and is provided in SIB. Alternatively or additionally, a first threshold can be associated to a UE type and a second threshold can be associated to CE features. The UE would use the largest threshold among the first and second configured thresholds to select a PRACH resource for transmission.

The method 1200 as illustrated in FIG. 12 describes an example procedure for a UE to select a PRACH resource that the UE uses for initial PRACH transmission and retransmissions, if any, according to the disclosure.

In step 1210, a UE (such as the UE 116) is provided a configuration for a first and second PRACH resources partitions, wherein the first partition is associated to a first group of UE capabilities and the second partition is associated to a second group of UE capabilities. In step 1220, the UE determines the PRACH resources partition from which to select PRACH resources for transmission based on the UE capabilities. In step 1230, the UE selects a PRACH resource from the determined partition. In step 1240, the UE uses the selected PRACH resource for an initial PRACH transmission and, if a RAR is not received after the initial PRACH transmission, for a PRACH retransmission.

The method 1300 as illustrated in FIG. 13 describes an example procedure for a UE to select a PRACH resource for initial transmission from a first partition and a PRACH resource for a PRACH retransmission from a second partition according to the disclosure.

In step 1310, a UE (such as the UE 116) is provided a configuration for PRACH resources partitions, wherein one partition is associated to one group of UE capabilities and another partition is associated to another group of UE capabilities, and an RSRP threshold. In step 1320, UE determines a first PRACH resources partition to use for a first transmission based on an RSRP measurement and the RSRP threshold. In step 1330, the UE selects a first PRACH resource from the first partition and transmits the first PRACH resource. In step 1340, the UE determines a second PRACH resources partition to use for retransmission when a RAR is not received after the first transmission. In step 1350, the UE selects a second PRACH resource from the second partition and transmits the second PRACH resource.

In certain embodiments, a gNB (such as the BS 102) can configure a UE (such as the UE 116) to a single TDRA table for Msg3 transmission. Here the TDRA table includes an indication of a number of repetitions in each row. The UE can determine to transmit Msg3 PUSCH with or without repetitions based on RSRP measurements and a configured RSRP threshold. The RSRP measurements can be based on an SS/PBCH block or on a CSI-RS, wherein the SS/PBCH can be a CD-SSB or an NCD-SSB. When the UE is indicated a value m in a RAR UL grant (wherein the value m provides a row index m+1 to the configured table), and the UE determines to transmit Msg3 PUSCH without repetition, the UE ignores a number of repetitions provided in row m+1 and transmits a Msg3 PUSCH in the time domain resources provided in row m+1 without repetitions. After reception by a gNB of a Msg3 PUSCH in a slot, the gNB attempts to receive Msg3 PUSCH in a subsequent slot. If present, the gNB receives the remaining repetitions of Msg3 PUSCH.

When a gNB (such as the BS 102) configures a UE (such as the UE 116) to a single TDRA table for Msg3 transmission (wherein the TDRA table includes an indication of a number of repetitions in each row and does not configure an RSRP threshold for Msg3 PUSCH repetitions or configures the RSRP threshold to be zero), the UE transmits Msg3 PUSCH with the number of repetitions indicated in row index m+1.

The method 1400 as illustrated in FIG. 14 describes an example procedure for a UE to determine a resource allocation in time domain for Msg3 PUSCH transmission according to the disclosure.

In step 1410, a UE (such as the UE 116) is configured a TDRA table. The TDRA table includes an indication of a number of repetitions in each row. In step 1420, the UE is indicated a value m in a RAR UL grant, wherein the value provides a row index m+1 to the configured TDRA table. In step 1430, UE determines to transmit Msg3 PUSCH with a number of repetitions indicated by an entry in row m+1 of the configured table based on RSRP measurements and configured threshold. The RSRP measurements can be based on an SS/PBCH block or on a CSI-RS or a RAR or a combination of some or all of these receptions. In step 1440, the UE transmits a Msg3 PUSCH with repetitions using resources determined from the configured table.

In certain embodiments, a gNB (such as the BS 102) can configures a UE (such as the UE 116) to a single TDRA table for Msg3 transmission, wherein the TDRA table includes an indication of a number of repetitions in each row and also configure PRACH resources or preambles partitions corresponding to Msg3 PUSCH transmission with or without repetitions and an RSRP threshold. Based on RSRP measurements and the configured RSRP threshold, wherein the RSRP measurements can be based on an SS/PBCH block or on a CSI-RS, wherein the SS/PBCH can be a CD-SSB or an NCD-SSB, the UE selects a PRACH resources or preambles partition and transmits Msg3 PUSCH.

The method 1500 as illustrated in FIG. 15 describes an example procedure for a UE to determine a resource allocation in time domain for Msg3 PUSCH transmission according to the disclosure.

In step 1510, a UE (such as the UE 116) is provided a configuration for PRACH resources partitions, wherein a first partition is associated to Msg3 PUSCH transmission with repetitions and a second partition is associated to Msg3 PUSCH transmission without repetitions, and an RSRP threshold. in step 1520, the UE is provided a configuration for a TDRA table that includes a number of repetitions in each row. In step 1530, the UE selects the second PRACH resources partition based on RSRP measurements and the configured threshold. In step 1340, the UE is indicated a field value m in a RAR UL grant, wherein the value provides a row index m+1 to the selected TDRA table. In step 1350, the UE transmits a Msg3 PUSCH without repetitions in the resources determined from the selected TDRA table.

In certain embodiments, for a Type-2 random access procedure, a UE (such as the UE 116) determines time resources and frequency resources for PUSCH occasions in an active or initial UL BWP from rnsgA-PUSCH-Config for the active or initial UL BWP. The UE can be provided an information in SIB for transmission of MsgA with repetition. The number of repetitions can be indicated in SIB or can be a default value when transmission of MsgA with repetitions is enabled in SIB. For example, the number of repetitions can be a value from a range of values {1, 2, 3, 4, 7, 8, 12, 16}.

The method 1600 as illustrated in FIG. 16 describes an example procedure for a UE to determine a MsgA PUSCH transmission according to the disclosure.

In step 1610, a UE (such as the UE 116) is provided a configuration for Type-2 random access procedure. In step 1620, the UE is provided a number of repetitions for MsgA PUSCH transmission in SIB. In step 1630, the UE determines time resources and frequency resources for PUSCH occasions in an active or initial UL BWP from msgA-PUSCH-Config. In step 1640, the UE transmits the MsgA PUSCH with repetitions in the determined time and frequency resources.

The method 1700 as illustrated in FIG. 17 describes an example procedure for a UE to determine a MsgA PUSCH transmission according to the disclosure.

In step 1710, a UE (such as the UE 116) is provided a configuration for PRACH resources partitions, wherein a first partition is associated to MsgA PUSCH transmission with repetitions and a second partition is associated to MsgA PUSCH transmission without repetitions, and an RSRP threshold. In step 1720, the UE is provided a configuration for Type-2 random access procedure and a number of repetitions for MsgA PUSCH transmission. In step 1730, the UE selects the first PRACH resources partition based on RSRP measurements and the configured threshold. In step 1740, the UE transmits a MsgA PUSCH with the number of configured repetitions in the determined time and frequency resources.

Although FIG. 11 illustrates the method 1100, FIG. 12 illustrates the method 1200, FIG. 13 illustrates the method 1300, FIG. 14 illustrates the method 1400, FIG. 15 illustrates the method 1500, FIG. 16 illustrates the method 1600, and FIG. 17 illustrates the method 1700 various changes may be made to FIGS. 11-17. For example, while the methods 1100-1700 are shown as a series of steps, various steps could overlap, occur in parallel, occur in a different order, or occur multiple times. In another example, steps may be omitted or replaced by other steps. For example, steps of the methods 1100-1700 can be executed in a different order.

Embodiments of the present disclosure also describe determining repetitions for a Msg3 PUSCH transmission from a partitioning/mapping of PRACH resources. This is described in the following examples and embodiments, such as those of FIG. 18.

Figure 18:
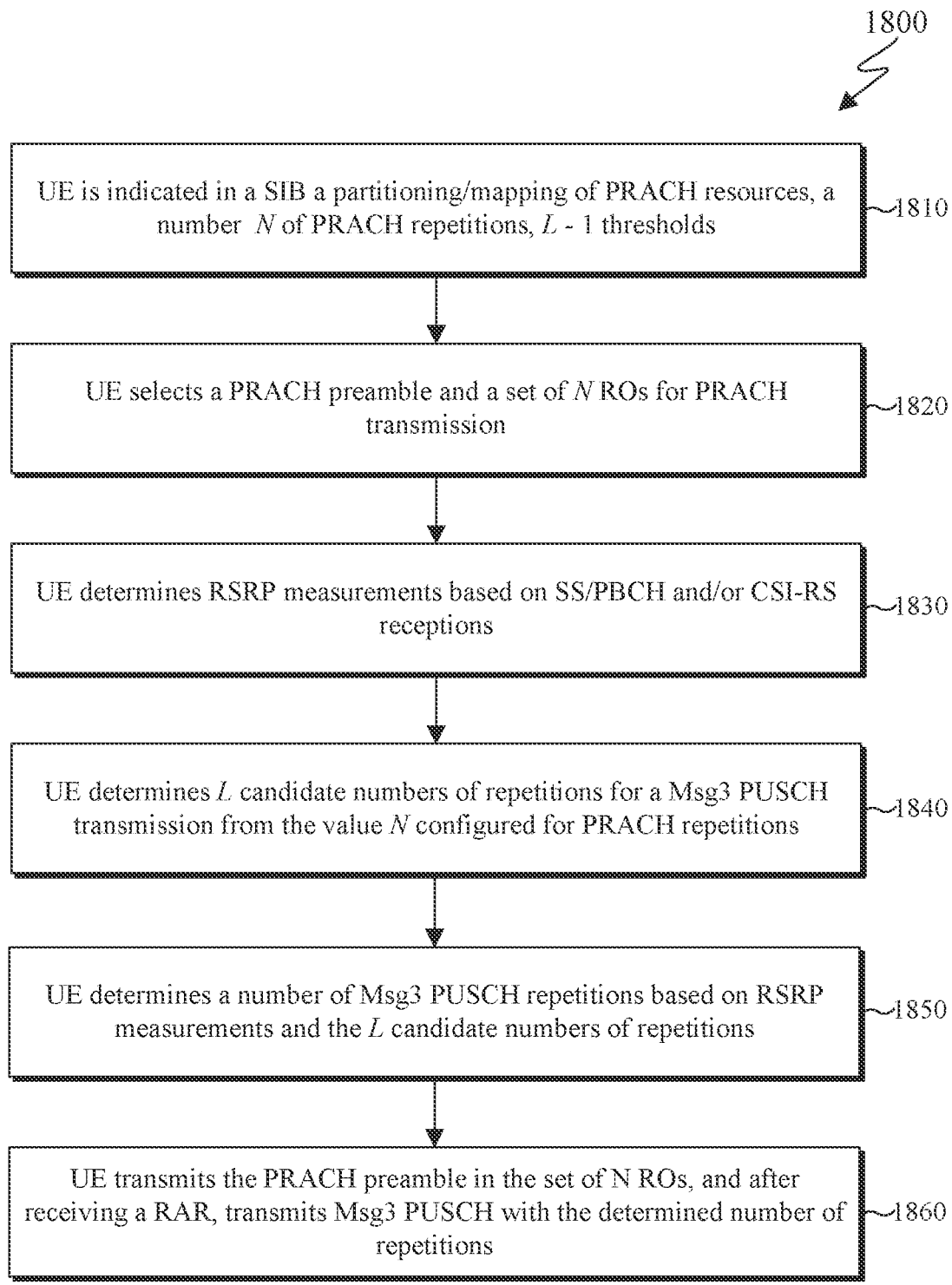
FIG. 18 illustrates an example method for transmitting a Msg3 PUSCH with a number of repetitions according to embodiments of the present disclosure.

FIG. 18 illustrates an example method 1800 for transmitting a Msg3 PUSCH with a number of repetitions according to embodiments of the present disclosure.

The steps of the method 1800 of FIG. 18 can be performed by any of the UEs 111-116 of FIG. 1, such as the UE 116 of FIG. 3. The method 1800 is for illustration only and other embodiments can be used without departing from the scope of the present disclosure.

In certain embodiments, partitioning PRACH resources can be associated with one or multiple features supported by a UE. For example, partitioning PRACH resources can be associated with a Msg3 PUSCH transmission with repetitions. For another example, partition of PRACH resources can be used by a UE that supports Msg3 PUSCH transmission with repetitions as well as support Msg3 PUSCH transmission with multiple spatial filters, such as by cycling a certain number of repetitions over a certain number of spatial filters. For another example, a partition of PRACH resources can be used by a UE that supports Msg3 PUSCH transmission with repetitions and supports transmission of an indication in Msg3. It is noted that the indication can be with a request for scheduling of a Msg3 PUSCH transmission with repetitions, or a request for adjusting a certain number of repetitions for a Msg3 PUSCH transmission, or a certain number of repetitions for a Msg3 PUSCH transmission, or a channel quality report. The channel quality report can be based on receptions of SS/PBCH blocks and/or CSI-RS by the UE. A partition of PRACH resources can also be used by a UE that supports Msg3 PUSCH transmission with repetitions to transmit Msg3 PUSCH with a certain number of repetitions that the UE determines based on measurements of SS/PBCH and/or CSI-RS receptions.

A gNB (such as the BS 102) can indicate in a system information block (SIB) a partitioning/mapping of the PRACH resources where resources from a first partition are selected by UEs that support Msg3 PUSCH transmission with repetitions and resources from a second partition are selected by UEs that do not support Msg3 PUSCH transmission with repetitions. It is also possible that a gNB can configure in a SIB a partition of PRACH resources where the resources from a first partition are selected by a first UE to indicate a request for repetitions of a Msg3 PUSCH transmission and resources from a second partition are selected by a second UE to indicate a request for a Msg3 PUSCH without repetitions or by a third UE that does not support a Msg3 PUSCH transmission with repetitions.

A gNB (such as the BS 102) can also configure in a SIB a partition of RACH occasions (ROs). For example, the ROs in a first partition can be used by a UE capable of transmitting Msg3 with repetitions. A gNB can also configure RO indices that can be used by a UE to transmit PRACH in sets of N ROs. When a UE selects a set of N ROs, the UE transmits a PRACH preamble in the N ROs before the UE receives a RAR.

A gNB (such as the BS 102) can configure in a SIB a partition of PRACH preambles that can be used by a UE capable of transmitting Msg3 with repetitions. The UE can select one or more PRACH preambles for transmission in a single RO or in a set of ROs with a spatial filter or by cycling over different spatial filters before the UE receives a corresponding RAR.

A gNB (such as the BS 102) can configure in a SIB one or more partitions of PRACH preambles and/or one or more partitions of ROs that can be used by a UE capable of transmitting Msg3 with repetitions. For example, a partition of PRACH preambles can be associated to a UE capability to transmit Msg3 PUSCH with repetitions, and a partition of ROs can be associated to a UE request to transmit a Msg3 PUSCH with repetitions.

In certain embodiments, a mapping can exist between one or more partitions of PRACH preambles and one or more partitions of ROs. For example, a UE can select a PRACH preamble from a partition of PRACH preambles and select a single RO or a set of multiple ROs from a corresponding partition of ROs in order to indicate one of three elements. For example, the UE can select a PRACH preamble from a partition of PRACH preambles and select a single RO or a set of multiple ROs from a corresponding partition of ROs in order to indicate its capability of transmitting Msg3 PUSCH with repetitions. Additionally, or alternatively, the UE can select a PRACH preamble from a partition of PRACH preambles and select a single RO or a set of multiple ROs from a corresponding partition of ROs in order to indicate a request to be scheduled to transmit a Msg3 PUSCH with repetitions. Additionally, or alternatively, the UE can select a PRACH preamble from a partition of PRACH preambles and select a single RO or a set of multiple ROs from a corresponding partition of ROs in order to indicate a request to be scheduled a number $N^{REP}$ of repetitions for a Msg3 PUSCH transmission, wherein the number can be predetermined, indicated in the SIB, or there can be multiple numbers $N^{REP}$ indicated in the SIB together with a mapping to a partition of PRACH preambles.

For example, a first partition of PRACH preambles comprising preambles that can be used by a UE capable of transmitting Msg3 with repetitions can be mapped to a first and a second partition of ROs. The first partition of ROs comprises ROs that can be used by the UE to request to be scheduled a Msg3 PUSCH transmission with repetitions, and the second partition of ROs comprises ROs that can be used by the UEs to request to be scheduled a Msg3 PUSCH transmission without repetitions. A UE that is capable to transmit a Msg3 PUSCH repetitions and needs to transmit a Msg3 PUSCH with repetitions, for example as determined by an RSRP measurement and an indication in a SIB for transmission of Msg3 PUSCH with repetitions when a measured RSRP is smaller than a threshold indicates in the SIB, would select one or more preambles from the first partition of PRACH preambles and a single RO or a set of ROs from the first partition of ROs.

For another example, a first partition of PRACH preambles comprising preambles that can be used by a UE capable of transmitting Msg3 with repetitions is mapped to 2 partitions of ROs. In a first approach, the first partition of ROs comprises ROs that can be used by the UE to request to be scheduled a Msg3 PUSCH transmission with repetitions. and the second partition of ROs comprises ROs that can be used by the UE to request to be scheduled a Msg3 PUSCH transmission without repetitions. In a second approach, the first partition of ROs comprises ROs that can be used by the UE to request to be scheduled a Msg3 PUSCH transmission with a first number of repetitions, and the second partition of ROs comprises ROs that can be used by the UE to request to be scheduled a Msg3 PUSCH transmission with a second number of repetitions, wherein the first or second number of repetitions includes a value of 1. In certain embodiments, the first and second approaches can be combined so that a total of three partitions of ROs are used to indicate a request to be scheduled a Msg3 PUSCH transmission with a first number of repetitions, a request to be scheduled a Msg3 PUSCH transmission with a second number of repetitions, and a request to be scheduled a Msg3 PUSCH transmission without repetitions, respectively. In certain embodiments, the first and second approaches can also be combined so that a total of four partitions of ROs are used. For example, the first and second numbers can be predetermined in the specifications of the system operation or can be indicated in a SIB. A UE that is capable to transmit a Msg3 PUSCH with repetitions and needs to transmit a Msg3 PUSCH with at the first number of repetitions can select one or more preambles from the first partition of PRACH preambles and a single RO or a set of ROs from the third partition of ROs.

A gNB (such as the BS 102) can configure in a SIB one or more RSRP thresholds that a UE (such as the UE 116) can use to determine a number of repetitions for Msg3 PUSCH transmission from a set of numbers of repetitions configured in the SIB or determined from a number of repetitions configured for a PRACH transmission. The UE can determine the number of repetitions for Msg3 PUSCH based on RSRP measurements of SS/PBCH and/or CSI-RS receptions and on the configured thresholds.

A gNB (such as the BS 102) can configure in SIB a single number of repetitions that a UE (such as the UE 116) can use as the number of repetitions to transmit a Msg3 PUSCH when the UE selects a PRACH preamble for transmission in a single RO or in a set of ROs from a partition/mapping of PRACH resources associated with Msg3 PUSCH transmission with repetitions.

A gNB (such as the BS 102) can configure in SIB a single threshold and a corresponding number of repetitions that a UE (such as the UE 116) can use to determine a number of Msg3 PUSCH repetitions when a UE measurement is above the threshold, otherwise the number of repetitions is 1. In another example, a gNB can configure, through a SIB, a number of L thresholds that a UE can use to determine the number of Msg3 repetitions from a configured L−1 numbers of repetitions.

A UE (such as the UE 116) can also derive a number of Msg3 PUSCH repetitions from a number of PRACH repetitions. When a gNB (such as the BS 102) configures a single threshold, the UE can determine whether to transmit Msg3 PUSCH with a number of repetitions equal to the number of PRACH repetitions or to transmit Msg3 PUSCH without repetitions. When a gNB configures more than one threshold, the UE can determine a number of repetitions for Msg3 PUSCH from a set of numbers of repetitions derived from a configured number of repetitions for a PRACH preamble transmission. For example, if N is the number of PRACH repetitions transmitted in a single RO or in a set of N ROs and 2 thresholds are configured, possible numbers of Msg3 PUSCH repetitions can be 0, N, 2N. In another example, possible numbers of Msg3 PUSCH repetitions can be 0, ¼N ½N.

A UE (such as the UE 116) can also derive a number of Msg3 PUSCH repetitions from a set of configured numbers of repetitions and an indication in RAR. For example, a 2-bit field in RAR can indicate one of four repetition numbers provided by higher layers.

The method 1800 as illustrated in FIG. 18 describes an example procedure for a UE to transmit a Msg3 PUSCH with a number of repetitions according to the present disclosure.

In step 1810, a UE (such as the UE 116) is indicated in a SIB a partitioning/mapping of PRACH resources, a number N of PRACH repetitions, and L−1 thresholds. In step 1820, the UE selects a PRACH preamble and a set of N ROs for PRACH transmission. In step 1830, the UE measures an RSRP based on SS/PBCH and/or CSI-RS receptions. In step 1840, the UE determines L candidate numbers of repetitions from the number N of PRACH repetitions. In step 1850, the UE determines a number of repetitions for a Msg3 PUSCH transmission based on RSRP measurements and the candidate numbers of repetitions. In step 1860, the UE transmits the PRACH preamble in the set of N ROs, and after receiving a RAR, the UE transmits Msg3 PUSCH with the determined number of repetitions.

Although FIG. 18 illustrates the method 1800 various changes may be made to FIG. 18. For example, while the method 1800 is shown as a series of steps, various steps could overlap, occur in parallel, occur in a different order, or occur multiple times. In another example, steps may be omitted or replaced by other steps. For example, steps of the method 1800 can be executed in a different order.

Embodiments of the present disclosure also describe determining a number of repetitions for a Msg3 PUSCH transmission when a selection of PRACH resources by a UE indicates support of MSG3 PUSCH repetitions. This is described in the following examples and embodiments, such as those of FIG. 19.

Figure 19:
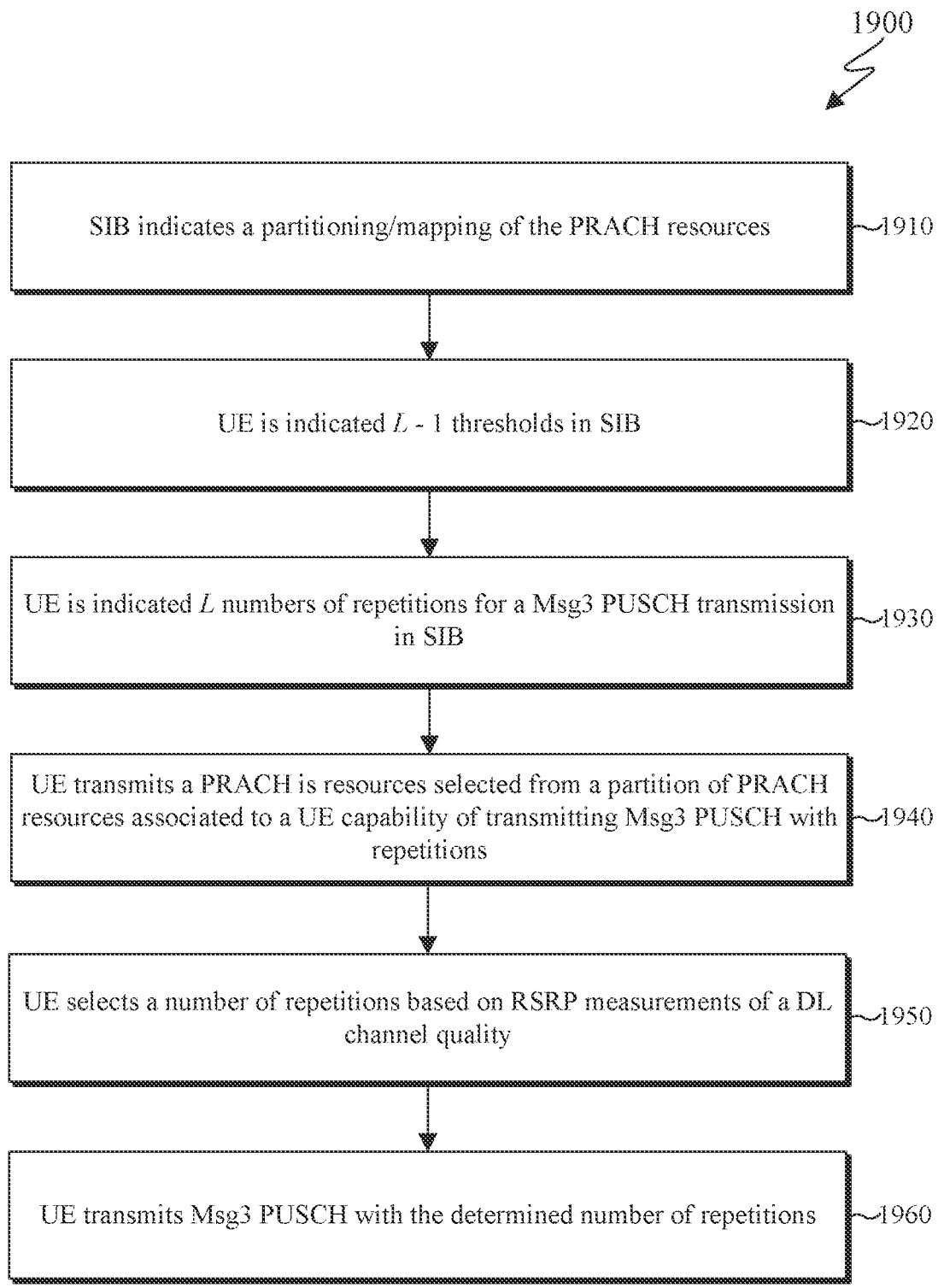
FIG. 19 illustrates an example method for identifying whether a UE supports Msg3 PUSCH transmissions with repetitions according to embodiments of the present disclosure.

FIG. 19 illustrates an example method 1900 for identifying whether a UE supports Msg3 PUSCH transmissions with repetitions according to embodiments of the present disclosure.

The steps of the method 1900 of FIG. 19 can be performed by any of the UEs 111-116 of FIG. 1, such as the UE 116 of FIG. 3. The method 1900 is for illustration only and other embodiments can be used without departing from the scope of the present disclosure.

In certain embodiments a gNB (such as the BS 102) identifies whether or not a UE can transmit a Msg3 PUSCH with repetitions from PRACH resources the UE uses to initiate a RA procedure.

The method 1900 as illustrated in FIG. 19 describes an example where identification by a gNB of whether or not a UE supports Msg3 PUSCH transmission with repetitions is based on a resource used for an associated PRACH transmission and a number of repetitions for a Msg3 PUSCH transmission is determined from configured values in a SIB.

In step 1910, an SIB indicates a partitioning/mapping of PRACH resources. A UE (such as the UE 116) selects either resources from a partition supporting Msg3 PUSCH transmission with repetitions or resources from another partition that do not support Msg3 PUSCH transmission with repetitions. In step 1920, the UE is indicated L−1 RSRP thresholds in SIB. In step 1930, the UE is indicated L numbers of repetitions for a Msg3 PUSCH transmission in the SIB. In step 1940, the UE transmits a PRACH selected from a partition of PRACH resources associated to a UE capability of transmitting Msg3 PUSCH with repetitions. In step 1950, the UE selects a number of repetitions based on RSRP measurements of a DL channel quality, wherein the DL channel quality is estimated from a received SS/PBCH and/or a CSI-RS. In step 1960, the UE transmits Msg3 PUSCH with the determined number of repetitions.

Although FIG. 19 illustrates the method 1900 various changes may be made to FIG. 19. For example, while the method 1900 is shown as a series of steps, various steps could overlap, occur in parallel, occur in a different order, or occur multiple times. In another example, steps may be omitted or replaced by other steps. For example, steps of the method 1900 can be executed in a different order.

Embodiments of the present disclosure also describe determining Msg3 PUSCH transmission when selection of PRACH resources indicates a request to transmit Msg3 PUSCH repetitions. This is described in the following examples and embodiments, such as those of FIG. 20.

Figure 20:
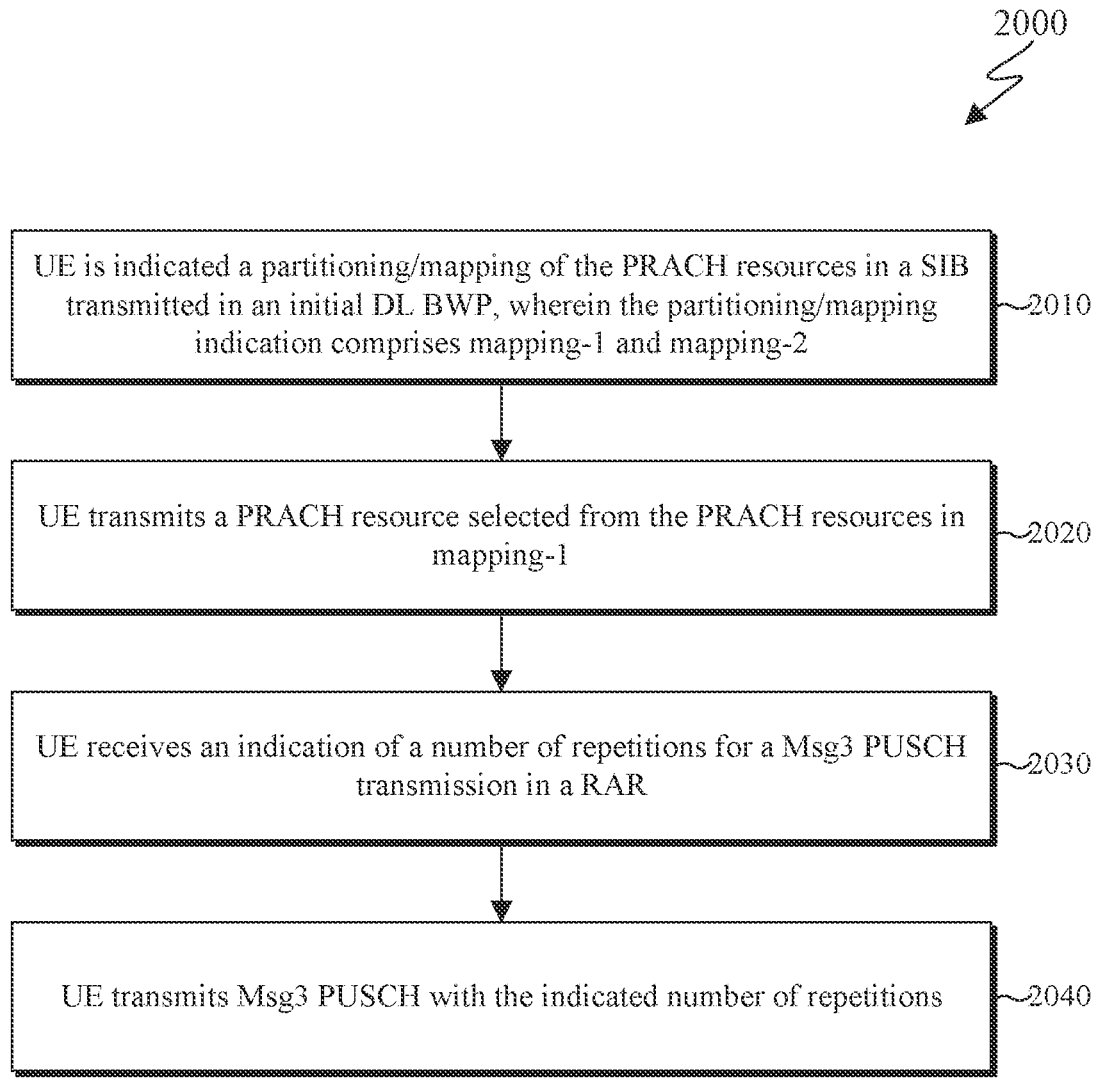
FIGS. 20 and 21 illustrate example methods for requesting a number of repetitions for a Msg3 PUSCH transmission by selecting a PRACH resource from a partition of PRACH resources according to embodiments of the present disclosure.

FIG. 20 illustrates an example method 2000 for requesting a number of repetitions for a Msg3 PUSCH transmission by selecting a PRACH resource from a partition of PRACH resources according to embodiments of the present disclosure.

The steps of the method 2000 of FIG. 20 can be performed by any of the UEs 111-116 of FIG. 1, such as the UE 116 of FIG. 3. The method 2000 is for illustration only and other embodiments can be used without departing from the scope of the present disclosure.

In certain embodiments, a UE (such as the UE 116) indicates to a gNB (such as the BS 102) to be scheduled to transmit a Msg3 PUSCH with repetitions. After receiving an indication of a number of repetitions for a Msg3 PUSCH transmission by the gNB, the UE transmits Msg3 with the indicated number of repetitions.

A gNB (such as the BS 102) can configure in a SIB a partition of PRACH resources. A UE can select resources from a partition to request a Msg3 PUSCH transmission with repetitions or select resources from another partition to request Msg3 PUSCH transmission without repetitions or select resources from yet another partition to indicate that the UE does not support Msg3 PUSCH repetitions. After a PRACH reception in a PRACH resource from the first partition, the gNB indicates to a corresponding UE a certain number of repetitions for a Msg3 PUSCH transmission by a field in an UL grant provided by the RAR message for scheduling the Msg3 PUSCH transmission.

The method 2000 as illustrated in FIG. 20 describes an example where a UE requests a number of repetitions for a Msg3 PUSCH transmission by selecting a PRACH resource from a partition of PRACH resources.

In step 2010 a UE (such as the UE 116) is indicated a partitioning/mapping of PRACH resources in a SIB. The partitioning/mapping indication comprises a mapping-1 and a mapping-2. Here, Mapping-1 resources in a first partition of PRACH preambles are mapped to a first partition of ROs that a UE can select to request a certain number of repetitions for a Msg3 PUSCH transmission. Mapping-2 resources in a second partition of PRACH preambles are mapped to a second partition of ROs that a UE can select to request a Msg3 PUSCH transmission without repetitions or to indicate that the UE does not support Msg3 PUSCH repetitions.

In step 2020, the UE transmits a PRACH using a resource selected from the PRACH resources in mapping-1.

In step 2030, the UE receives an indication for a number of repetitions for a Msg3 PUSCH transmission in a RAR, wherein a field in the UL grant provided by the RAR message scheduling the Msg3 PUSCH transmission indicates the number of repetitions. Alternatively, in step 2030 the indication of the number of repetitions is not present in a RAR, and at step 640 the UE transmits Msg3 PUSCH with no repetitions. Alternatively, in step 2030 the UE receives an indication to transmit a Msg3 PUSCH with a number of repetitions, wherein the number of repetitions is configured in SIB. Alternatively, in step 2030 the UE receives an indication to transmit a Msg3 PUSCH with a number of repetitions, wherein the number of repetitions is determined by the UE based on RSRP measurements of SS/PBCH receptions and/or CSI-RS receptions, one or more configured thresholds, and one or more configured number of repetitions.

In step 2040, the UE transmits the Msg3 PUSCH with the indicated number of repetitions.

Although FIG. 20 illustrates the method 2000 various changes may be made to FIG. 20. For example, while the method 2000 is shown as a series of steps, various steps could overlap, occur in parallel, occur in a different order, or occur multiple times. In another example, steps may be omitted or replaced by other steps. For example, steps of the method 2000 can be executed in a different order.

Embodiments of the present disclosure also describe determining Msg3 PUSCH transmission when selection of PRACH resources indicates a request to transmit with a number of Msg3 PUSCH repetitions. This is described in the following examples and embodiments, such as those of FIG. 21.

Figure 21:
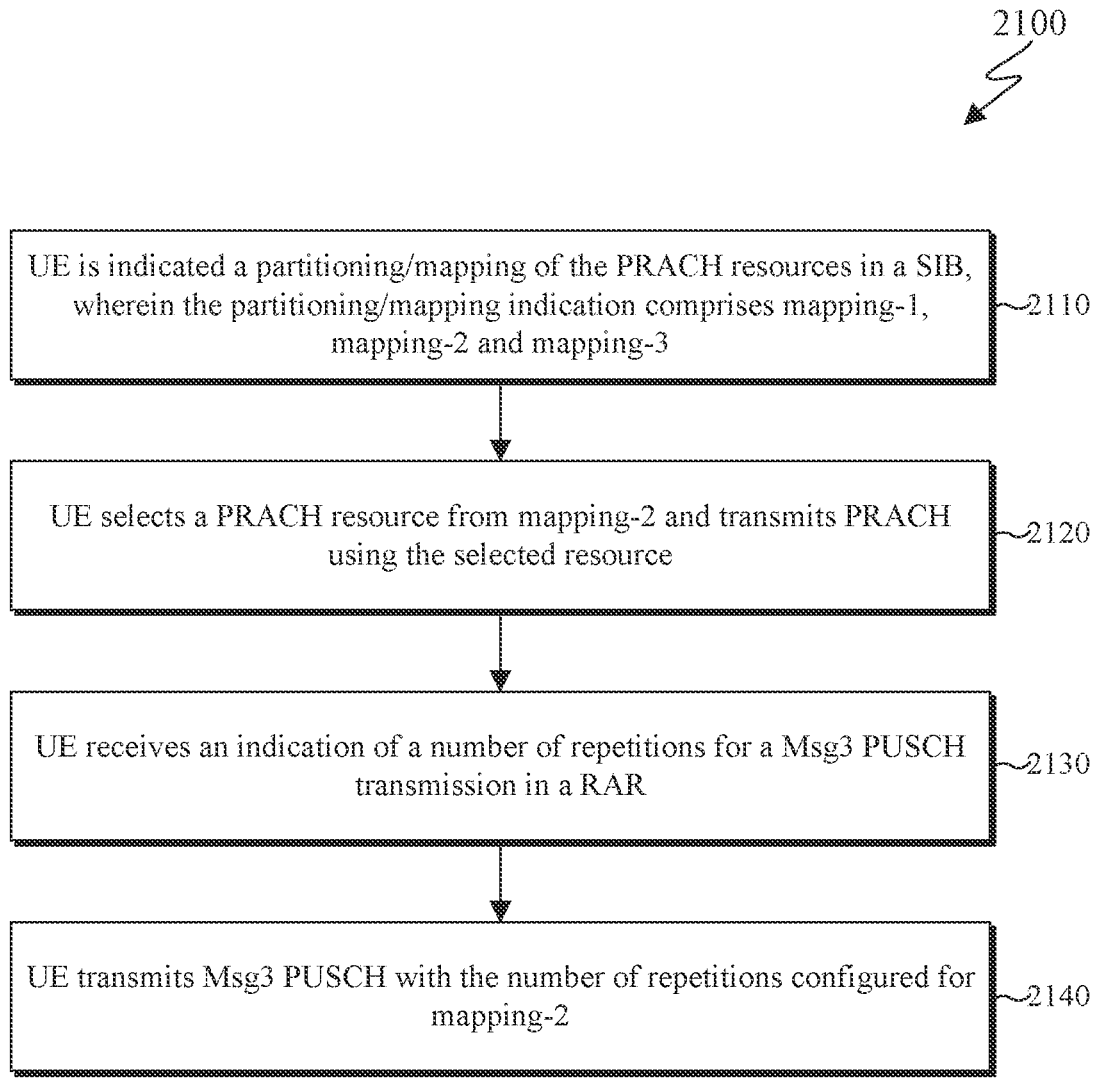

FIG. 21 illustrates an example method 2100 for requesting a number of repetitions for a Msg3 PUSCH transmission by selecting a PRACH resource from a partition of PRACH resources according to embodiments of the present disclosure.

The steps of the method 2100 of FIG. 21 can be performed by any of the UEs 111-116 of FIG. 1, such as the UE 116 of FIG. 3. The method 2100 is for illustration only and other embodiments can be used without departing from the scope of the present disclosure.

A UE (such as the UE 116) can indicate to a gNB (such as the BS 102) to be scheduled to transmit Msg3 PUSCH with a first number of repetitions. After receiving a RAR, the UE can transmit with the first number of repetitions or with a second number of repetitions that was indicated by the gNB in a RAR message scheduling the Msg3 PUSCH transmission or was configured by a gNB.

A gNB (such as the BS 102) can configure in a SIB partitions of PRACH resources wherein a UE selects resources from a first partition/mapping to request a number of repetitions for a Msg3 PUSCH transmission or selects resources from a second partition/mapping to request to transmit a Msg3 PUSCH without repetitions. After receiving a PRACH in a PRACH resource, the gNB indicates a certain number of repetitions for a Msg3 PUSCH transmission by a field in the UL grant provided by the RAR message scheduling the Msg3 PUSCH transmission.

The method 2100 as illustrated in FIG. 21 describes an example where a UE requests a number of repetitions for a Msg3 PUSCH transmission by selecting a PRACH resource from a partition of PRACH resources.

In step 2110, a UE (such as the UE 116) is indicated a partitioning/mapping of PRACH resources in a SIB. The partitioning/mapping indication comprises mapping-1 resources, mapping-2 resources, and mapping-3 resources. Mapping-1 resources in a first partition of PRACH preambles are mapped to a first partition of ROs that a UE can select to request a first number of Msg3 PUSCH repetitions. Mapping-2 resources in a first partition of PRACH preambles are mapped to a second partition of ROs that a UE can select to request a second number of Msg3 PUSCH repetitions. Mapping-3 resources in a second partition of PRACH preambles are mapped to a partition of ROs that a UE can select to request a Msg3 PUSCH transmission without repetitions.

In step 2120, the UE transmits a PRACH in a resource selected from the PRACH resources in mapping-2. In step 2130, the UE receives an indication for a number of repetitions for a Msg3 PUSCH transmission in a RAR. In step 2140, the UE transmits Msg3 PUSCH with the with the number of repetitions configured for mapping-2. Alternatively, the UE transmits Msg3 PUSCH with the number of repetitions indicated in RAR.

In certain embodiments, at step 2130 the UE receives an indication in a RAR. Here, the indication is to transmit Msg3 PUSCH without repetitions. Thereafter in step 2140 the UE transmits Msg3 PUSCH without repetitions. The indication in a RAR can be a 1-bit flag.

Although FIG. 21 illustrates the method 2100 various changes may be made to FIG. 21. For example, while the method 2100 is shown as a series of steps, various steps could overlap, occur in parallel, occur in a different order, or occur multiple times. In another example, steps may be omitted or replaced by other steps. For example, steps of the method 2100 can be executed in a different order.

Embodiments of the present disclosure also describe determining Msg3 PUSCH transmission when a UE requests to transmit Msg3 PUSCH repetitions—BWP associated to Msg3 PUSCH repetitions. This is described in the following examples and embodiments, such as those of FIG. 22.

Figure 22:
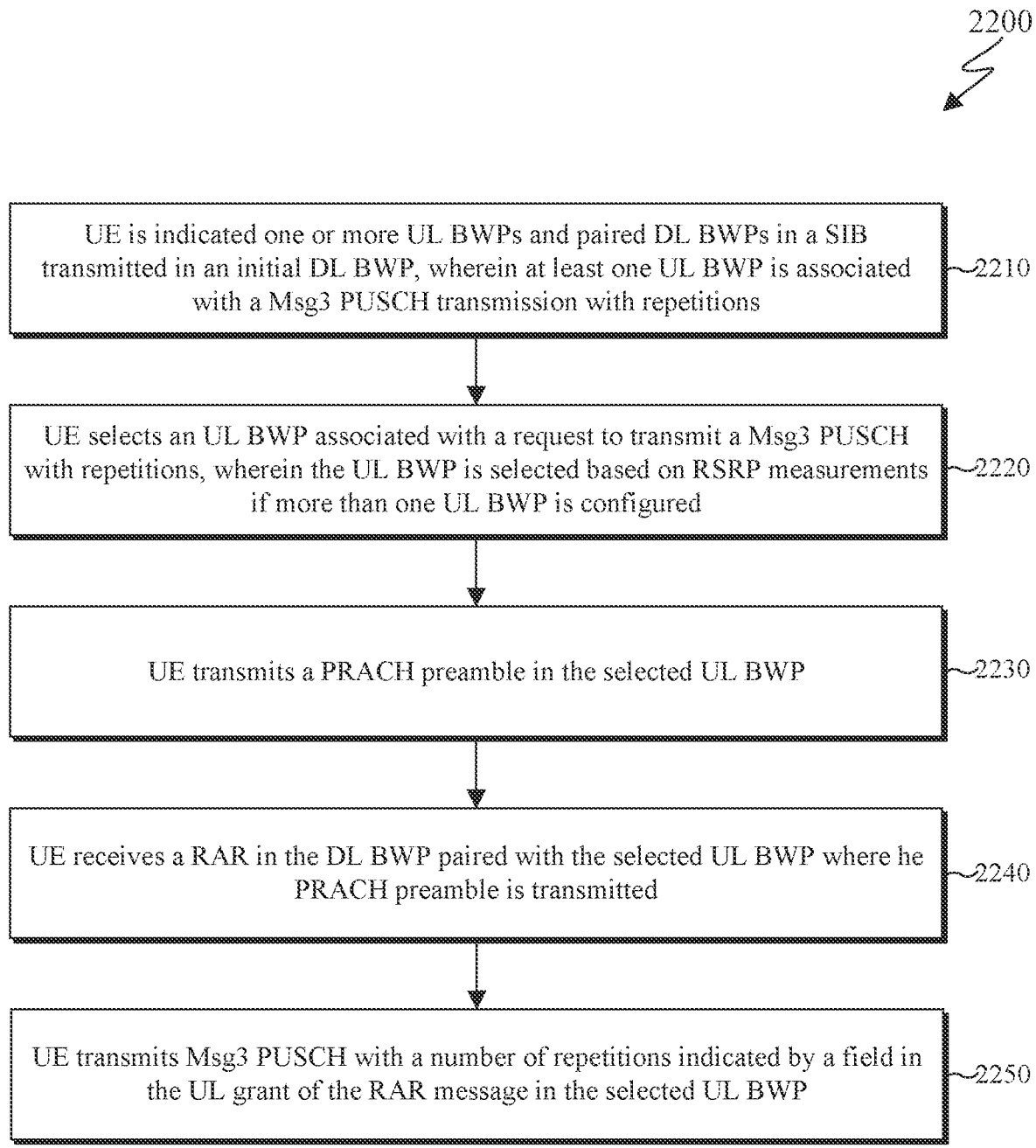
FIG. 22 illustrates an example method for selecting an uplink (UL) bandwidth patch (BWP) to indicate a request to transmit Msg3 PUSCH with a number of repetitions according to embodiments of the present disclosure.

FIG. 22 illustrates an example method 2200 for selecting an UL BWP to indicate a request to transmit Msg3 PUSCH with a number of repetitions according to embodiments of the present disclosure.

The steps of the method 2200 of FIG. 22 can be performed by any of the UEs 111-116 of FIG. 1, such as the UE 116 of FIG. 3. The method 2200 is for illustration only and other embodiments can be used without departing from the scope of the present disclosure.

A gNB (such as the BS 102) can configure in a SIB different UL BWPs. It is noted that one or more BWPs are associated with a Msg3 PUSCH transmission without repetitions and one or more BWPs are associated with a Msg3 PUSCH transmission with repetitions. The gNB can configure different UL BWPs corresponding to different numbers of repetitions for Msg3 PUSCH transmission and/or for PRACH transmission. The number of repetitions for Msg3 PUSCH transmission and/or for PRACH transmission for each UL BWP can be indicated in a SIB. A UE (such as the UE 116) can select an UL BWP for initial access depending on whether the UE supports repetitions of Msg3 PUSCH. A UE can also select an UL BWP for initial access to request to transmit Msg3 PUSCH with repetitions. The UE can select an UL BWP based on RSRP measurements of SS/PBCH and/or CSI-RS receptions, wherein the SIB also indicates a mapping of an RSRP range to an UL BWP. The UE transmits a Msg3 PUSCH with a certain number of repetitions indicated by the gNB, wherein the number of repetitions can be 1 or larger than 1. When a request by the UE is associated to a first number of repetitions, the gNB can schedule the UE with a second number of repetitions that is same as or different than the first number of repetitions. The UL grant in the RAR message for the UE can include a field with a value scaling a certain number of repetitions for a Msg3 PUSCH transmission relative to a certain number of repetitions associated with the UL BWP of the Msg3 PUSCH transmission. For example, when the number of repetitions is 8, the value can be ¼, ½, 1, or 2. Alternatively, M values of repetitions for a Msg3 PUSCH transmission can be associated with an UL BWP and a field of $\log_2 M$ bits can indicate one of the M values.

The method 2200 as illustrated in FIG. 22 describes an example where a UE selects an UL BWP to indicate a request to transmit Msg3 PUSCH with a number of repetitions, wherein the UL BWP and a paired DL BWP are indicated in a SIB.

In step 2210, a UE (such as the UE 116) is indicated one or more UL BWPs and paired DL BWPs in a SIB transmitted in an initial DL BWP. It is noted that at least one UL BWP is associated with a Msg3 PUSCH transmission with repetitions. In step 2220, the UE selects an UL BWP associated with a request to transmit a Msg3 PUSCH with repetitions, wherein the UL BWP is selected based on RSRP measurements if more than one UL BWP is configured. In step 2230, the UE transmits a PRACH preamble in the selected UL BWP. In step 2240, the UE receives a RAR in the DL BWP paired with the selected UL BWP where the PRACH preamble is transmitted. In step 2250, the UE transmits Msg3 PUSCH with a number of repetitions indicated by a field in the UL grant of the RAR message in the selected UL BWP.

For time division duplexing (TDD) systems, in addition to the indication of different UL BWPs that is transmitted in an initial DL BWP with CORESET #0, a gNB (such as the BS 102) also indicates another DL BWP with another CORESET #0 and an associated UL BWP. For example, the gNB can indicate in a SIB transmitted in an initial DL BWP, an UL BWP (UL BWP-1) associated with Msg3 transmission without repetitions and paired with the initial DL BWP, an UL BWP (UL BWP-2) associated with Msg3 transmission with repetitions, and a DL BWP with another CORESET #0 paired with the UL BWP-2. Additionally, an UL BWP can be associated with transmission of PRACH repetitions, and/or with transmission using a certain number of different spatial filters. A UE that supports Msg3 PUSCH transmission with repetitions can select UL BWP-2 and transmit a PRACH preamble in BWP-2. A UE can select an UL BWP for initial access depending on whether the UE supports repetitions of a Msg3 PUSCH transmission, and/or whether the UE requests to transmit a Msg3 PUSCH with repetitions. The selection of an UL BWP can also be associated to other features supported or requested by the UE, such as whether (or not) the UE supports repetitions of a PRACH preamble transmission with several different spatial filters.

Although FIG. 22 illustrates the method 2200 various changes may be made to FIG. 22. For example, while the method 2200 is shown as a series of steps, various steps could overlap, occur in parallel, occur in a different order, or occur multiple times. In another example, steps may be omitted or replaced by other steps. For example, steps of the method 2200 can be executed in a different order.

Embodiments of the present disclosure also describe determining Msg3 PUSCH transmission when a UE requests to transmit Msg3 PUSCH repetitions—NB associated to Msg3 PUSCH repetitions. This is described in the following examples and embodiments, such as those of FIGS. 23 and 24.

Figure 23:
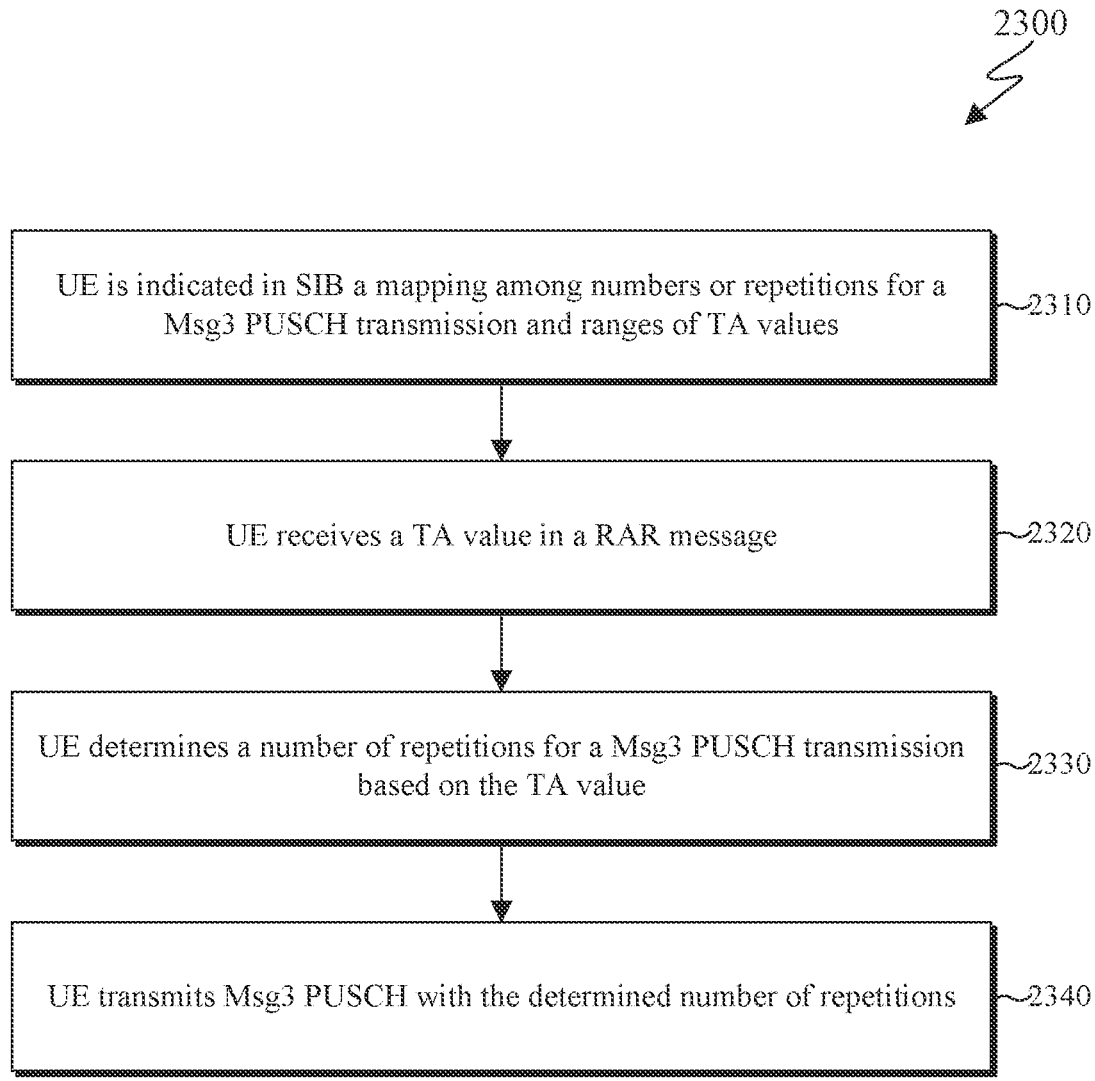
FIG. 23 illustrates an example method for selecting a number of repetitions for a Msg3 PUSCH transmission based on an indication in random access response (RAR) and a mapping in a system information block (SIB) according to embodiments of the present disclosure.
Figure 24:
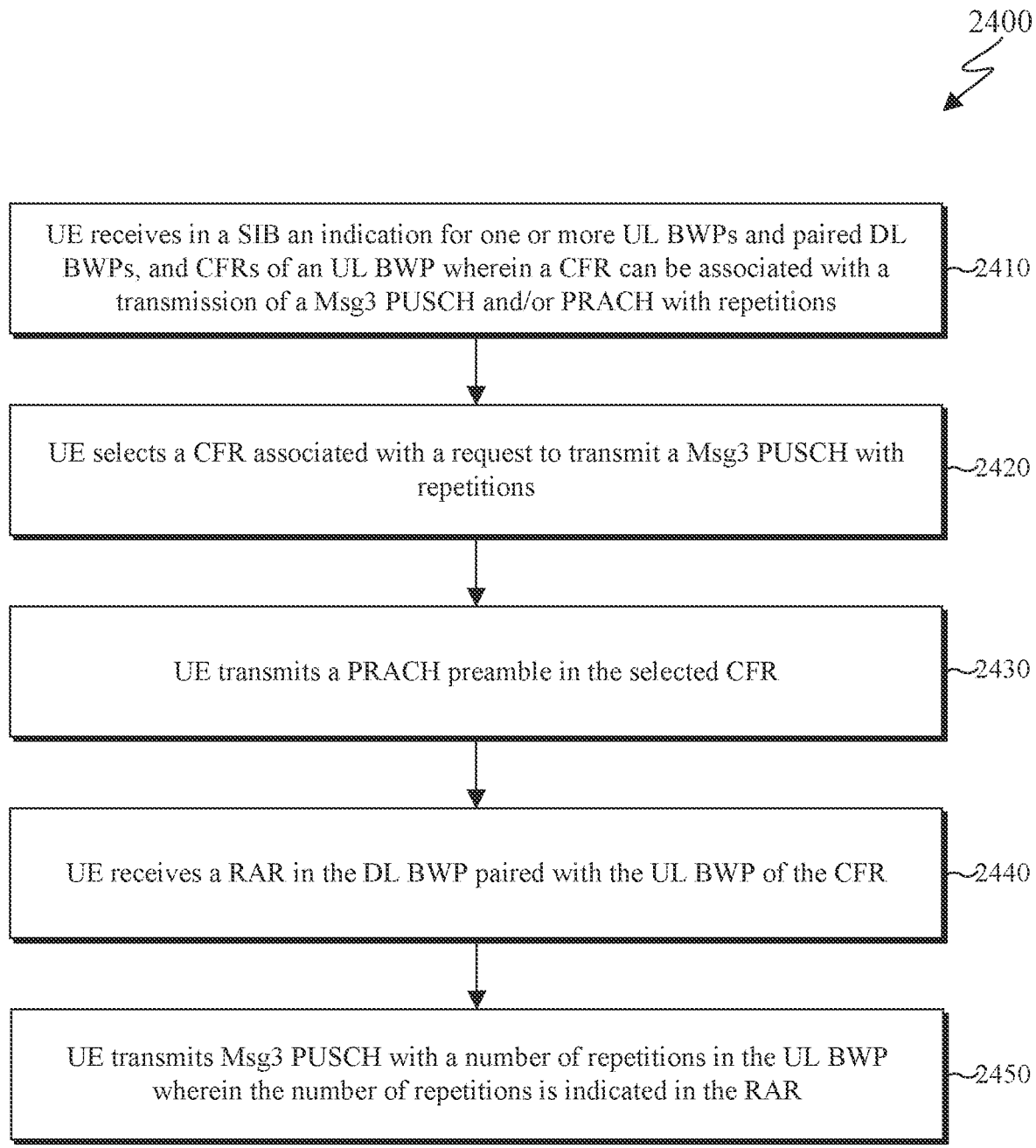
FIG. 24 illustrates an example method for selecting a common frequency region (CFR) of an UL BWP to indicate a request to transmit a Msg3 PUSCH with repetitions according to embodiments of the present disclosure.

FIG. 23 illustrates an example method 2300 for selecting a number of repetitions for a Msg3 PUSCH transmission based on an indication in RAR and a mapping in a SIB according to embodiments of the present disclosure. FIG. 24 illustrates an example method 2400 for selecting a CFR of an UL BWP to indicate a request to transmit a Msg3 PUSCH with repetitions according to embodiments of the present disclosure.

The steps of the method 2300 of FIG. 23 and the method 24 of FIG. 24 can be performed by any of the UEs 111-116 of FIG. 1, such as the UE 116 of FIG. 3. The methods 2300 and 2400 are for illustration only and other embodiments can be used without departing from the scope of the present disclosure.

A gNB (such as the BS 102) can also configure in a SIB different common frequency regions (CFRs) of a BWP wherein a CFR can be associated with a transmission of Msg3 PUSCH and/or PRACH with repetitions or without repetitions. A gNB can configure multiple CFRs of an UL BWP associated, wherein each CFR can be associated with different numbers of repetition for a Msg3 PUSCH transmission and/or a PRACH transmission, wherein the number of repetitions in different CFRs can be same or different, and one CFR can be configured with no repetitions. A mapping of a CFR to one or more repetitions can be indicated by the SIB. For example, the SIB can indicate an RSRP threshold and two CFRs, wherein a UE transmits PRACH in a first CFR if the UE does not require or does not support Msg3 PUSCH repetitions or transmits PRACH in a second CFR if the UE requires repetitions for a Msg3 PUSCH transmission and the number of repetitions can be indicated by a field in an UL grant of a RAR message that schedules the Msg3 PUSCH transmission. The number of repetitions can be from a predetermined number of repetitions or from a certain number of repetitions indicated in SIB.

In certain embodiments, it is possible that a UE (such as the UE 116) can select a CFR among the configured CFRs to request to transmit a Msg3 PUSCH with repetitions or to request to transmit a Msg3 PUSCH with a specific number of repetitions. The UE transmits a Msg3 PUSCH with a certain number of repetitions indicated by the gNB, for example by a field in an UL grant scheduling the Msg3 PUSCH transmission, wherein the number of repetitions can be 1 or larger than 1. When the request by the UE is associated with a first number of repetitions, the gNB can schedule the UE with a second number of repetitions, that is same as or different than the first number of repetitions.

In certain embodiments, it is also possible that a UE (such as the UE 116) transmits PRACH in a configured UL BWP and selects one of the CFRs of the BWP to transmit Msg3 PUSCH. It is noted that the selected CFR can be associated with a request to transmit a Msg3 PUSCH with repetitions or with a request to transmit a Msg3 PUSCH with a certain number of repetitions. The selection of the CFR by the UE can be based on RSRP measurements of SS/PBCH and/or CSI-RS receptions. The selection can also be based on an indication by the gNB through a field in the UL grant scheduling the Msg3 PUSCH transmission. For example, the gNB can determine a certain number of repetitions for a Msg3 PUSCH transmission based on a time advance (TA) value that the gNB determines based on the PRACH reception, wherein a larger TA value can be associated with a larger pathloss or equivalently a smaller RSRP for the UE. The TA value can also be implicitly used to indicate a certain number of repetitions wherein the gNB can indicate in a SIB a mapping among numbers or repetitions for a Msg3 PUSCH transmission and ranges of TA values, wherein the gNB includes a TA value for the UE in the RAR message.

The method 2300 as illustrated in FIG. 23 describes an example where a UE selects a certain number of repetitions for a Msg3 PUSCH transmission based on an indication in RAR and a mapping in a SIB.

In step 2310, a UE (such as the UE 116) is indicated in SIB a mapping among numbers or repetitions for a Msg3 PUSCH transmission and ranges of TA values. In step 2320, UE receives a TA value in a RAR message. In step 2330, the UE determines a number of repetitions for a Msg3 PUSCH transmission based on the TA value. In step 2340, the UE transmits Msg3 PUSCH with the determined number of repetitions.

Alternatively, instead of indicating a mapping among repetitions and TA values, the gNB can perform the mapping by its own implementation and use it to indicate a certain number of repetitions for a Msg3 PUSCH transmission in the RAR UL grant scheduling an initial transmission of a transport block (TB) in a Msg3 PUSCH or in a DCI format scheduling a potential retransmission of the TB in a PUSCH. It is also possible that a same number of repetitions is used for both an initial transmission and a retransmission of a TB in a Msg3 PUSCH and a DCI format scheduling a potential retransmission of the TB does not indicate a certain number of repetitions for the Msg3 PUSCH transmission.

In certain embodiments, a UE (such as the UE 116) transmits Msg3 PUSCH with a certain number of repetitions as indicated by the gNB, wherein the number of repetitions can be 1 or a value larger than 1. When the request by the UE is associated with a first number of repetitions, the gNB can schedule the UE with a second number of repetitions that is same as or different than the first number of repetitions.

The method 2400 as illustrated in FIG. 24 describes an example where a UE selects a CFR of an UL BWP to indicate a request to transmit a Msg3 PUSCH with repetitions, wherein the UL BWP and CFR, and paired DL BWP are indicated in a SIB.

In step 2410, a UE (such as the UE 116) receives in a SIB an indication for one or more UL BWPs and paired DL BWPs, and CFRs of an UL BWP wherein a CFR can be associated with transmission of a Msg3 PUSCH and/or PRACH with repetitions. In step 2420, the UE selects a CFR associated with a request to transmit a Msg3 PUSCH with repetitions, wherein for example the UE selects the CFR based on RSRP measurements. In step 2430, the e UE transmits a PRACH preamble in the selected CFR. In step 2440, the UE receives a RAR in the DL BWP paired with the UL BWP of the CFR. In step 2450, the UE transmits a Msg3 PUSCH with a number of repetitions in the UL BWP wherein the number of repetitions is indicated in the RAR.

Although FIG. 23 illustrates the method 2300 and FIG. 24 illustrates the method 2400 various changes may be made to FIGS. 23 and 24. For example, while the method 2100 is shown as a series of steps, various steps could overlap, occur in parallel, occur in a different order, or occur multiple times. In another example, steps may be omitted or replaced by other steps. For example, steps of the methods 2300 and 2400 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
a transceiver; and
a processor operably coupled to the transceiver and configured to:
identify a plurality of groups of physical random access channel (PRACH) resources, wherein each of the plurality of groups is associated with a set of features for the UE,
determine a target group of PRACH resources from the plurality of groups, and
perform a random access procedure based on the determined target group of PRACH resources,
wherein the plurality of groups includes a first group of PRACH resources associated with a first set of features for the UE and a second group of PRACH resources associated with a second set of features for the UE, and
wherein the transceiver is further configured to:
receive information on a first uplink (UL) bandwidth part (BWP) associated with the first group of PRACH resources, and
receive information on a second UL BWP associated with the second group of PRACH resources.

2. The UE of claim 1, wherein:
the first group of PRACH resources is associated with a message 3 (Msg 3) transmission with repetitions, and
the second group of PRACH resources is associated with a Msg 3 transmission without repetitions.

3. The UE of claim 1, wherein:
the first group of PRACH resources is associated with a message 3 (Msg 3) transmission of the random access procedure without repetitions,
the second group of PRACH resources is associated with a Msg 3 transmission with repetitions,
the transceiver is configured to receive a reference signal received power (RSRP) threshold, and
in case that a RSRP value measured by the UE is less than the RSRP threshold, the determined target group of PRACH resources is the second group of PRACH resources.

4. The UE of claim 1, wherein the set of features for the UE includes at least one of whether a message 3 (Msg 3) transmission of the random access procedure is performed with repetitions or whether the UE is a reduced capability UE.

5. The UE of claim 1, wherein
the transceiver is configured to receive information related to groups of PRACH resources, and
the identification is based on the information.

6. A base station (BS), comprising:
a transceiver; and
a processor operably coupled to the transceiver and configured to:
configure, to a user equipment (UE), a plurality of groups of physical random access channel (PRACH) resources, wherein each of the plurality of groups is associated with a set of features for the UE, and
perform, with the UE, a random access procedure based on a group of PRACH resources from the plurality of groups,
wherein the plurality of groups includes a first group of PRACH resources associated with a first set of features for the UE and a second group of PRACH resources associated with a second set of features for the UE, and
wherein the transceiver is further configured to:
transmit, to the UE, information on a first uplink (UL) bandwidth part (BWP) associated with the first group of PRACH resources, and
transmit, to the UE, information on a second UL BWP associated with the second group of PRACH resources.

7. The BS of claim 6, wherein:
the first group of PRACH resources is associated with a message 3 (Msg 3) transmission with repetitions, and
the second group of PRACH resources is associated with a Msg 3 transmission without repetitions.

8. The BS of claim 6, wherein:
the first group of PRACH resources is associated with a message 3 (Msg 3) transmission of the random access procedure without repetitions,
the second group of PRACH resources is associated with a Msg 3 transmission with repetitions, the transceiver is further configured to transmit a reference signal received power (RSRP) threshold, and in case that a RSRP value is less than the RSRP threshold, the group of PRACH resource is the second group of PRACH resources.

9. The BS of claim 6, wherein the set of features for the UE includes at least one of whether a message 3 (Msg 3) transmission of the random access procedure is performed with repetitions or whether the UE is a reduced capability UE.

10. The BS of claim 6, wherein:

the transceiver is configured to transmit information related to groups of PRACH resources, and the configuration is based on the information.

11. A method performed by a user equipment (UE) in a wireless communication system, the method comprising:

identifying a plurality of groups of physical random access channel (PRACH) resources, wherein each of the plurality of groups is associated with a set of features for the UE;

determining a target group of PRACH resources from the plurality of groups;

performing a random access procedure based on the determined target group of PRACH resources, wherein the plurality of groups includes a first group of PRACH resources associated with a first set of features for the UE and a second group of PRACH resources associated with a second set of features for the UE;

receiving information on a first uplink (UL) bandwidth part (BWP) associated with the first group of PRACH resources; and receiving information on a second UL BWP associated with the second group of PRACH resources.

12. The method of claim 11, further comprising:

wherein the first group of PRACH resources is associated with a message 3 (Msg 3) transmission with repetitions, and wherein the second group of PRACH resources is associated with a Msg 3 transmission without repetitions.

13. The method of claim 11, further comprising:

receiving a reference signal received power (RSRP) threshold, wherein the first group of PRACH resources is associated with a message 3 (Msg 3) transmission of the random access procedure without repetitions, wherein the second group of PRACH resources is associated with a Msg 3 transmission with repetitions, and wherein in case that a RSRP value measured by the UE is less than the RSRP threshold, the determined target group of PRACH resources is the second group of PRACH resources.

14. The method of claim 11, wherein the set of features for the UE includes at least one of whether a message 3 (Msg 3) transmission of the random access procedure is performed with repetitions or whether the UE is a reduced capability UE.

15. The method of claim 11, further comprising:

receiving information related to groups of PRACH resources;

wherein the identification is based on the information.

* * * * *